US012353157B2

(12) United States Patent
Kobayashi et al.

(10) Patent No.: US 12,353,157 B2
(45) Date of Patent: Jul. 8, 2025

(54) IMAGE FORMING APPARATUS

(71) Applicant: CANON KABUSHIKI KAISHA, Tokyo (JP)

(72) Inventors: Masato Kobayashi, Chiba (JP); Fumiki Hanafuji, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/441,158

(22) Filed: Feb. 14, 2024

(65) Prior Publication Data

US 2024/0280933 A1 Aug. 22, 2024

(30) Foreign Application Priority Data

Feb. 17, 2023 (JP) ................................ 2023-023876

(51) Int. Cl.

*G03G 15/00* (2006.01)
*G03G 15/16* (2006.01)
*G03G 15/32* (2006.01)
*G03G 21/00* (2006.01)

(52) U.S. Cl.

CPC ......... *G03G 15/751* (2013.01); *G03G 15/167* (2013.01); *G03G 15/32* (2013.01); *G03G 15/5041* (2013.01); *G03G 21/0011* (2013.01)

(58) Field of Classification Search

CPC ............. G03G 15/0844; G03G 15/161; G03G 21/0011; G03G 2221/0005; G03G 2221/0089

See application file for complete search history.

(56) References Cited

U.S. PATENT DOCUMENTS 5,640,230 A * 6/1997 Ono ..................... G03G 15/065 399/245
5,970,282 A * 10/1999 Yanagida ............. G03G 15/168 399/101
8,401,406 B2 3/2013 Nose
(Continued)

FOREIGN PATENT DOCUMENTS

JP 2007-304371 A 11/2007
JP 2008-268390 A 11/2008
(Continued)

OTHER PUBLICATIONS

Machine Translation of JP2009-053582. Mar. 12, 2009. (Year: 2009).*

*Primary Examiner* — Carla J Therrien
(74) *Attorney, Agent, or Firm* — Venable LLP

(57) ABSTRACT

An image forming apparatus includes a rotatable image bearing member, an image forming portion, a transfer portion, a cleaning blade, and a controller configured to carry out control so as to execute a predetermined cleaning operation At least in a predetermined range of a leading end portion of the predetermined toner image with respect to a first direction which is a surface movement direction of the image bearing member, when the predetermined toner image is viewed per unit area of 1 mm in each of the first direction and a second direction perpendicular to the first direction, the predetermined toner image includes a plurality of print portions extending along a predetermined direction and formed at different positions with respect to the second direction, and the predetermined direction forms an angle of 30° or less between itself and the first direction.

21 Claims, 14 Drawing Sheets

(56) References Cited

U.S. PATENT DOCUMENTS

| | | | | |
|---|---|---|---|---|
| 9,075,352 | B2 * | 7/2015 | Seki | G03G 21/0041 |
| 9,280,085 | B2 | 3/2016 | Nose | |
| 9,829,845 | B2 | 11/2017 | Nose | |
| 11,982,962 | B2 | 5/2024 | Hotomi | |
| 2003/0123907 | A1 * | 7/2003 | Nonaka | G03G 15/0887 399/257 |
| 2010/0272455 | A1 * | 10/2010 | Muramoto | G03G 15/50 399/66 |
| 2013/0272730 | A1 * | 10/2013 | Yoshida | G03G 15/5058 399/39 |
| 2014/0340457 | A1 * | 11/2014 | Hashimoto | G03G 21/0011 347/118 |
| 2017/0184993 | A1 * | 6/2017 | Niijima | G03G 15/043 |
| 2021/0302885 | A1 * | 9/2021 | Yagi | G03G 15/161 |
| 2022/0091543 | A1 * | 3/2022 | Saito | G03G 15/01 |

FOREIGN PATENT DOCUMENTS

| | | | |
|---|---|---|---|
| JP | 2009-053582 | A | 3/2009 |
| JP | 2011-048083 | A | 3/2011 |

* cited by examiner

IMAGE FORMING APPARATUS

FIELD OF THE INVENTION AND RELATED ART

The present invention relates to an image forming apparatus, such as a copying machine, a printer, a facsimile machine, or a multi-function machine having a plurality of functions of functions of these machines, using an electrophotographic type or an electrostatic recording type.

Conventionally, in the image forming apparatus using the electrophotographic type or the like, a cleaning device for removing a deposited matter such as toner (transfer residual toner) remaining on an image bearing member after a toner image is transferred from the image bearing member such as a photosensitive drum or an intermediary transfer belt onto a toner image receiving member (transfer receiving member) has been used. As this cleaning device, a cleaning device having a constitution in which a cleaning blade constituted as a cleaning member by a plate-like elastic member is contacted to a surface of the image bearing member and then the deposited matter such as the transfer residual toner is scraped off from the surface of the rotating image bearing member has been widely used.

In such a cleaning device, the toner reaches an edge portion of the cleaning blade, and a component of the toner and an external additive of the toner enter a blade nip which is a contact portion (nip) between the cleaning blade and the image bearing member. By this, a lubricating effect between the cleaning blade and the image bearing member is exhibited, so that a preferred cleaning performance can be obtained. However, when a state in which an amount of the toner reaching the edge portion of the cleaning blade is small is continued, a degree of slip between the cleaning blade and the image bearing member becomes poor, so that there is a possibility that noise such as chattering (chattering noise) or squeal due to fine vibration of the cleaning blade occurs or that turning-up of the cleaning blade occurs. Further, in the case where there is a need that a feeding (conveying) speed of the recording material is lowered, when a rotational speed of the image bearing member is lowered, the degree of slip between the cleaning blade and the image bearing member is liable to become poor in some instances.

On the other hand, in Japanese Laid-Open Patent Application (JP-A) 2007-304371, a technique that a toner band which is not to be transferred onto the recording material is formed on a photosensitive drum on the basis of a result of discrimination of a level of a lubricating property between a cleaning blade and the photosensitive drum is disclosed. Thus, a predetermined toner image for imparting the lubricant property to between the cleaning blade and the photosensitive drum by supplying acting as a lubricant to the edge portion of the cleaning blade is referred herein to as a "lubricating toner band".

In the image forming apparatus using the electrophotographic type, when a low-print ratio image which is an image with a low print ratio is continuously formed, toner consumed from the developing device becomes small, so that there is a possibility that a charging property and flowability of the toner lower. This is because by friction, with the toner, of members such as a developer member, a stirring member, a regulating member, and the like which are provided in the developing device, an external additive externally added to the toner for charge control and flowability control is peeled off from a base material of the toner or buried in a surface of the base material of the toner. For that reason, when the low-print ratio image is continuously formed, the toner lowered in charging performance flowability (herein, this voltage is referred to as "deteriorated toner") increases in the developing device (on the developer carrying member or in a developing container), so that there is a possibility that toner scattering, a fog (deposition of the toner on a non-image portion), and the like are liable to occur.

On the other hand, in JP-A 2011-48083, in order to prevent the toner from stagnating in the developing device for a long time, the following technique is disclosed. That is, every image formation, in the case where an index value (video count value) of a toner consumption amount is higher than a predetermined threshold, a difference between the threshold and the index value is calculated. Then, in the case where an integrated value obtained by integrating the calculated difference reaches a predetermined value, the toner band which is not to be transferred onto the recording material is formed, and the toner is forcedly discharged (consumed) from the developing device. A predetermined toner image for discharging the toner from the developing device when the low-print ratio image is thus formed is referred herein to as a "discharge toner band".

However, in recent years, for the purpose of improving an image quality, the toner is formed in a substantially spherical shape or the like, whereby there is a tendency that the flowability of the toner becomes high. When the flowability of the toner becomes high, in the case where the toner is excessively supplied to the edge portion of the cleaning blade, the toner passes through the cleaning blade without being completely scraped off by the cleaning blade, so that improper cleaning (cleaning failure) is liable to occur. Each of the lubricating toner band and the discharge toner band which are described above is a solid image formed over a substantially whole area of an image forming region with respect to a direction substantially perpendicular to a surface movement direction of the image bearing member in general, and therefore, an amount of the toner supplied to the edge portion of the cleaning blade per unit area is large. For that reason, in the case where the toner is excessively supplied to the edge portion of the cleaning blade by the lubricating toner band and the discharge toner band, the improper cleaning occurs in some instances.

Particularly, the discharge toner band is required to discharge the toner in a sufficient amount from the developing device, and therefore, in general, an amount of the toner of the discharge toner band is larger than an amount of the toner of the lubricating toner band. However, in order to suppress a lowering in productivity by suppressing an increase in downtime (period in which the image cannot be outputted) for performing a discharge toner band forming operation, it is not preferred that the discharge toner band is simply formed in a half-tone image.

SUMMARY OF THE INVENTION

Accordingly, one of principal objects of the present invention is to provide an image forming apparatus capable of suppressing improper cleaning of a discharge toner band while suppressing a lowering in productivity.

According to an aspect of the present invention, there is provided an image forming apparatus comprising: a rotatable image bearing member configured to bear a toner image; an image forming portion including a developing device for developing an electrostatic image with toner and configured to form the toner image on the image bearing member; a transfer portion configured to transfer the toner image from the image bearing member onto a recording material; a cleaning blade configured to remove the toner from the image bearing member; and a controller configured to carry out control so as to execute a predetermined operation in which a predetermined toner image which is not to be transferred onto the recording material is formed on the image bearing member and then is removed from the image bearing member by the cleaning blade, wherein at least in a predetermined range of a leading end portion of the predetermined toner image with respect to a first direction which is a surface movement direction of the image bearing member, when the predetermined toner image is viewed per unit area of 1 mm in each of the first direction and a second direction, which is a widthwise direction of the image bearing member perpendicular to the first direction, the predetermined toner image includes a plurality of print portions extending along a predetermined direction and formed at different positions with respect to the second direction, and the predetermined direction forms an angle of 30° or less between itself and the first direction.

According to another aspect of the present invention, there is provided an image forming apparatus comprising: a rotatable image bearing member configured to bear a toner image; an image forming portion including a developing device for developing an electrostatic image with toner and configured to form the toner image on the image bearing member; a transfer portion configured to transfer the toner image from the image bearing member onto a recording material; a cleaning blade configured to remove the toner from the image bearing member; and a controller configured to carry out control so as to execute a first operation in which a first toner image which is not to be transferred onto the recording material is formed on the image bearing member and then is removed from the image bearing member by the cleaning blade, and so as to execute a second operation in which a second toner image which is not to be transferred onto the recording material is formed on the image bearing member and then is removed from the image bearing member by the cleaning blade, wherein at least in a predetermined range of a leading end portion of the first toner image with respect to a first direction which is a surface movement direction of the image bearing member, when the first toner image is viewed per unit area of 1 mm in each of the first direction and a second direction, which is a widthwise direction of the image bearing member perpendicular to the first direction, the first toner image includes a plurality of first print portions extending along a first predetermined direction and formed at different positions with respect to the second direction, and the first predetermined direction forms an angle of 30° or less between itself and the first direction, and wherein when the second toner image is viewed per unit area of 1 mm in each of the first direction and the second direction, the second toner image includes a plurality of second print portions extending along a second predetermined direction and formed at different positions with respect to the first direction, and the second predetermined direction forms an angle of 30° or less between itself and the second direction.

Further features of the present invention will become apparent from the following description of exemplary embodiments with reference to the attached drawings.

Figure 9:
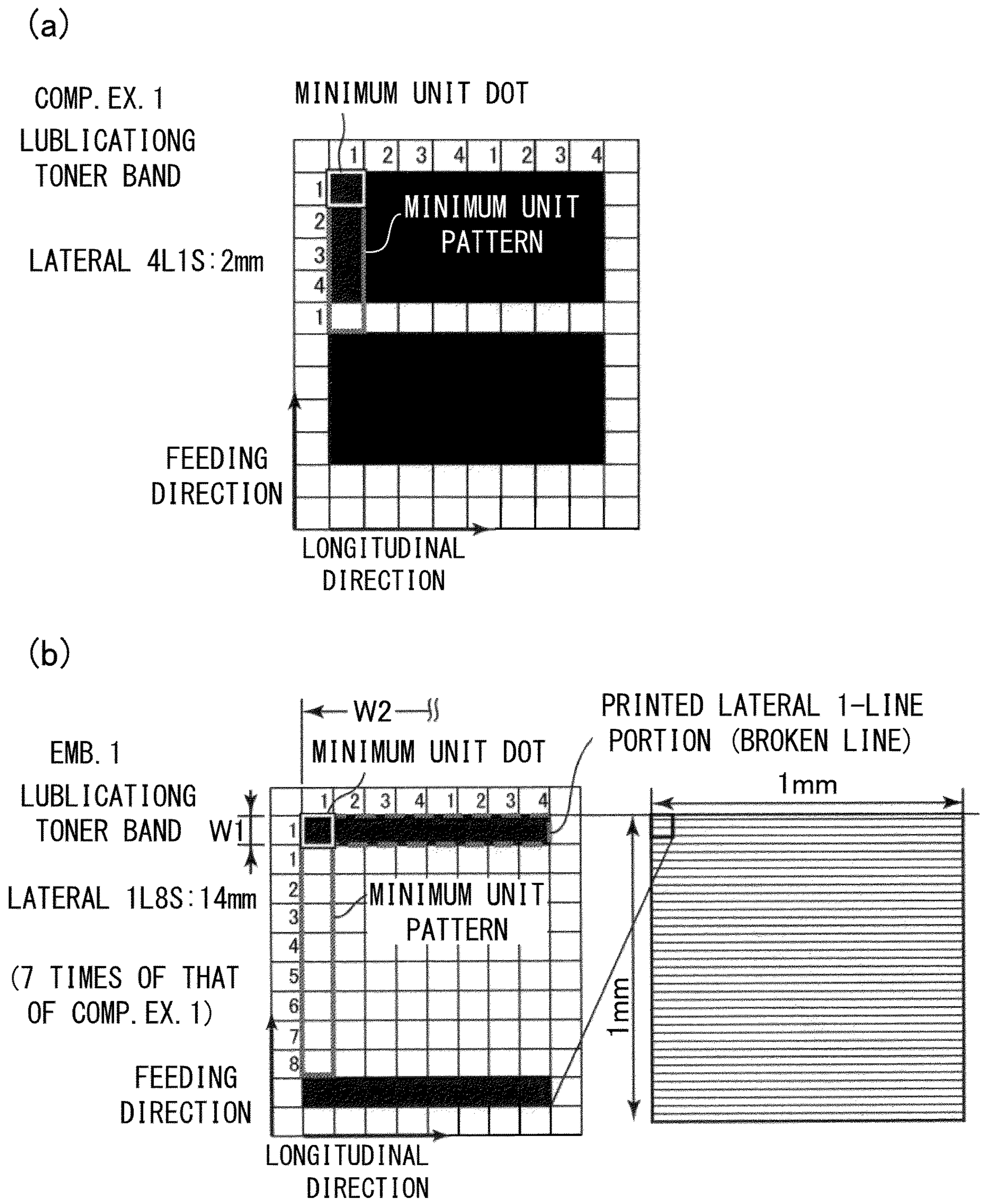

Parts (a) and (b) of FIG. 9 are schematic views each for illustrating a pattern of the lubricating toner band.

Figure 10:
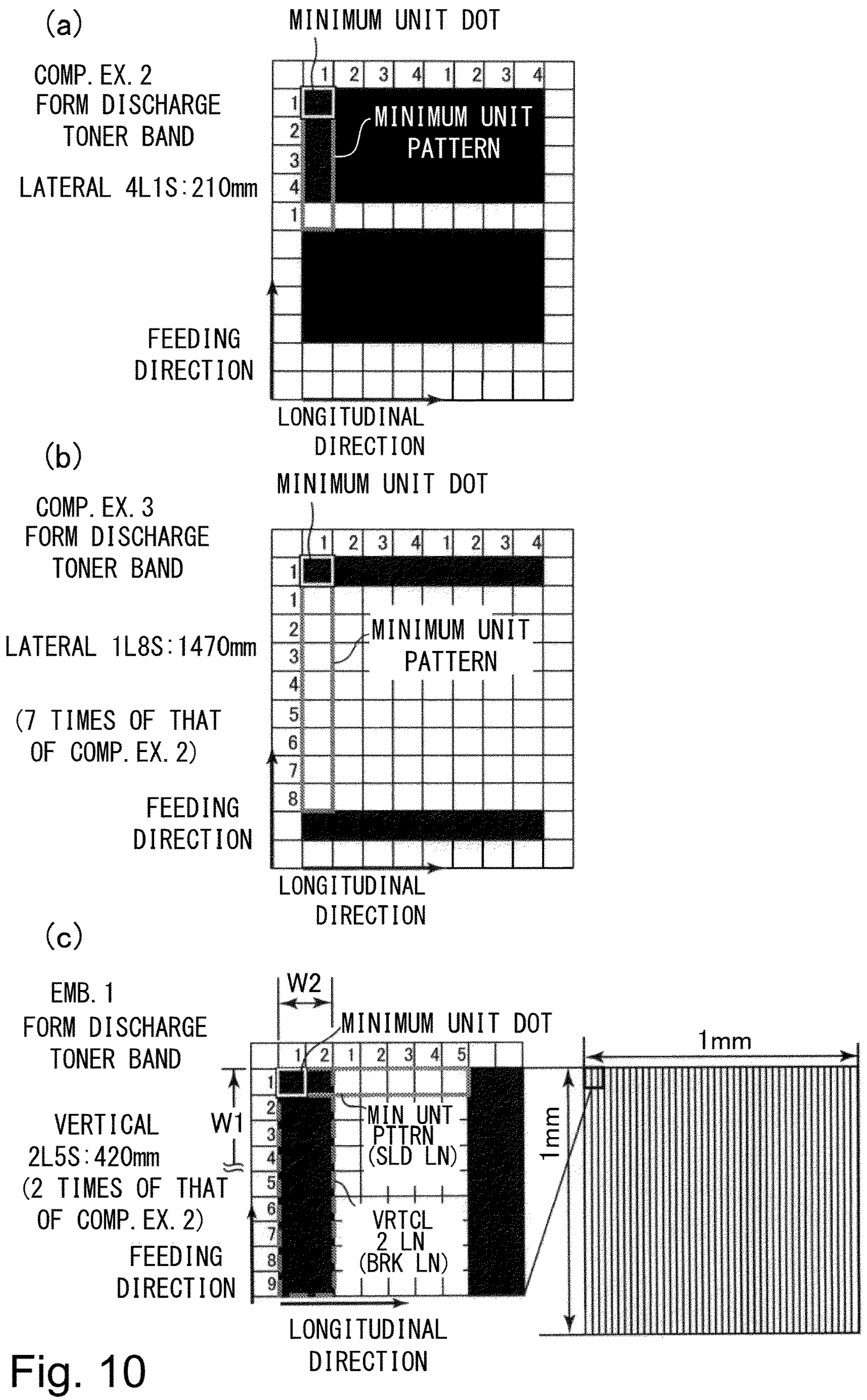

Parts (a) to (c) of FIG. 10 are schematic views each for illustrating a pattern of the discharge toner band.

Figure 11:
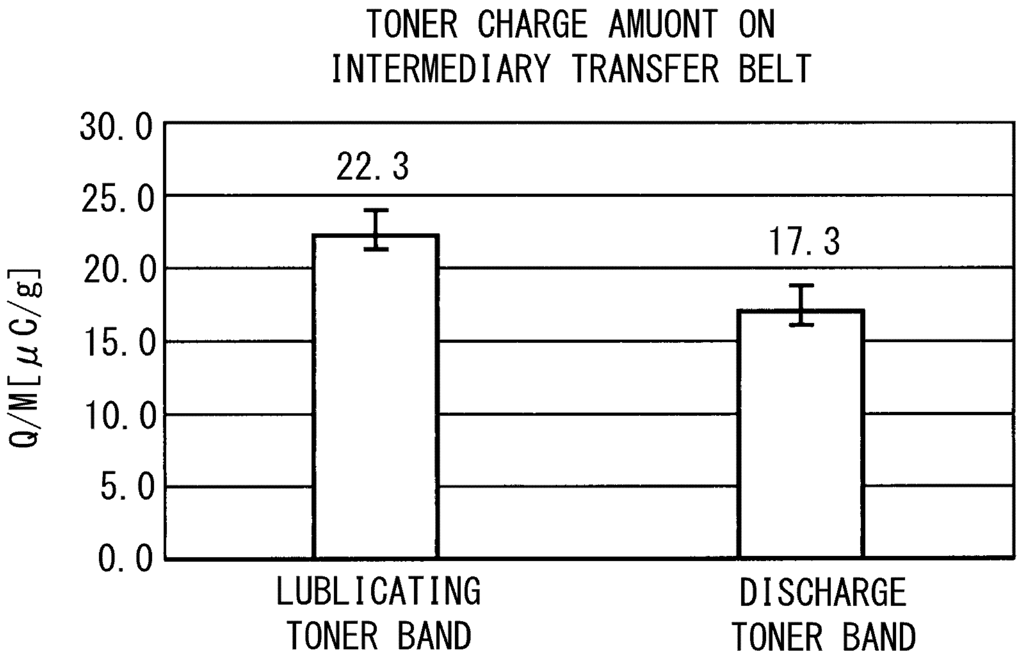

FIG. 11 is a graph showing charge amounts of the toner bands.

Figure 12:
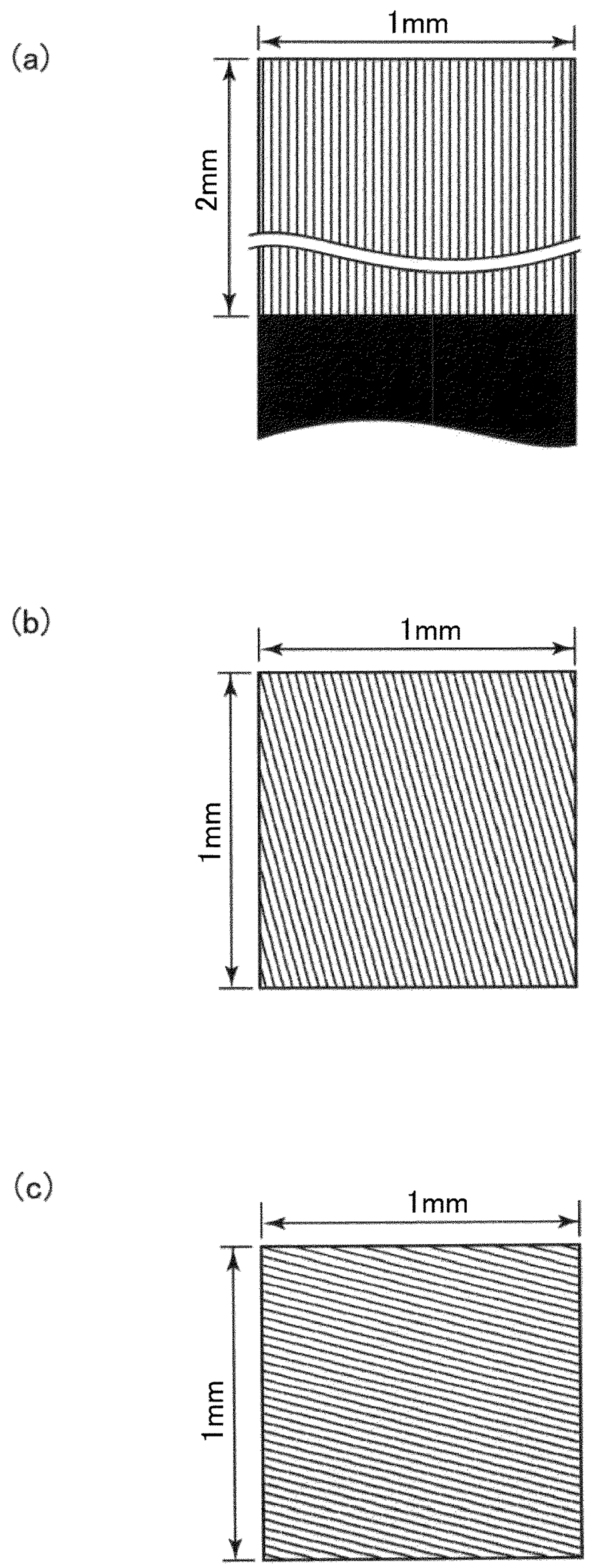

Parts (a) to (c) of FIG. 12 are schematic views each showing another example of the toner band.

Figure 13:
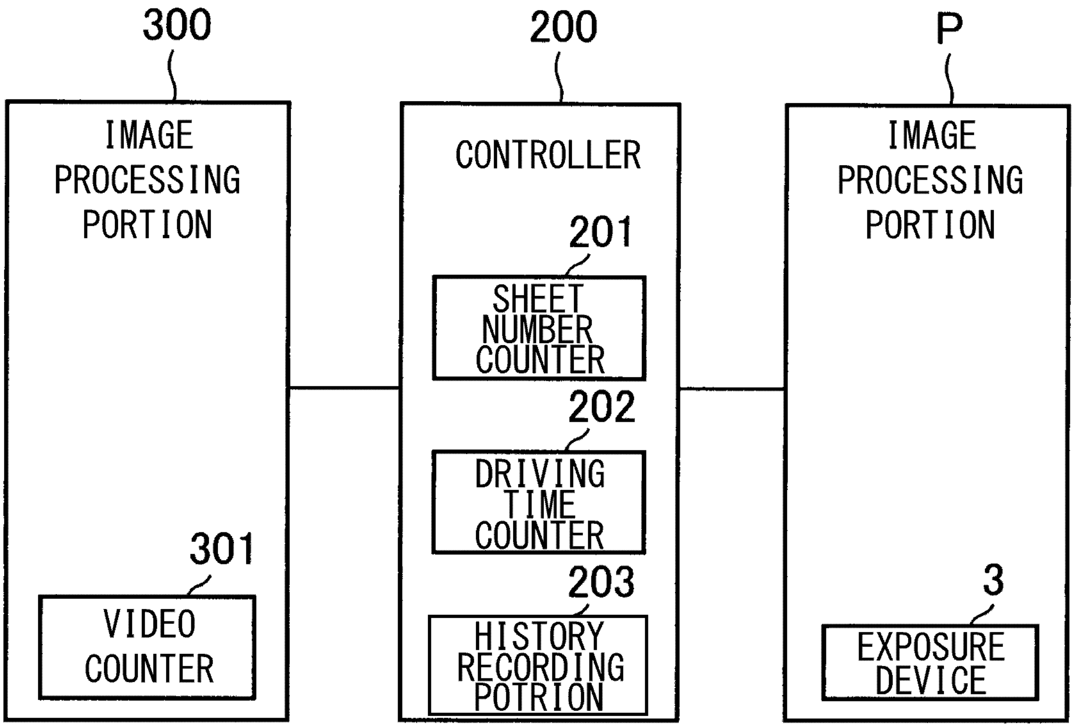

FIG. 13 is a schematic block diagram showing a control mode of an image forming apparatus according to another embodiment.

Figure 14:
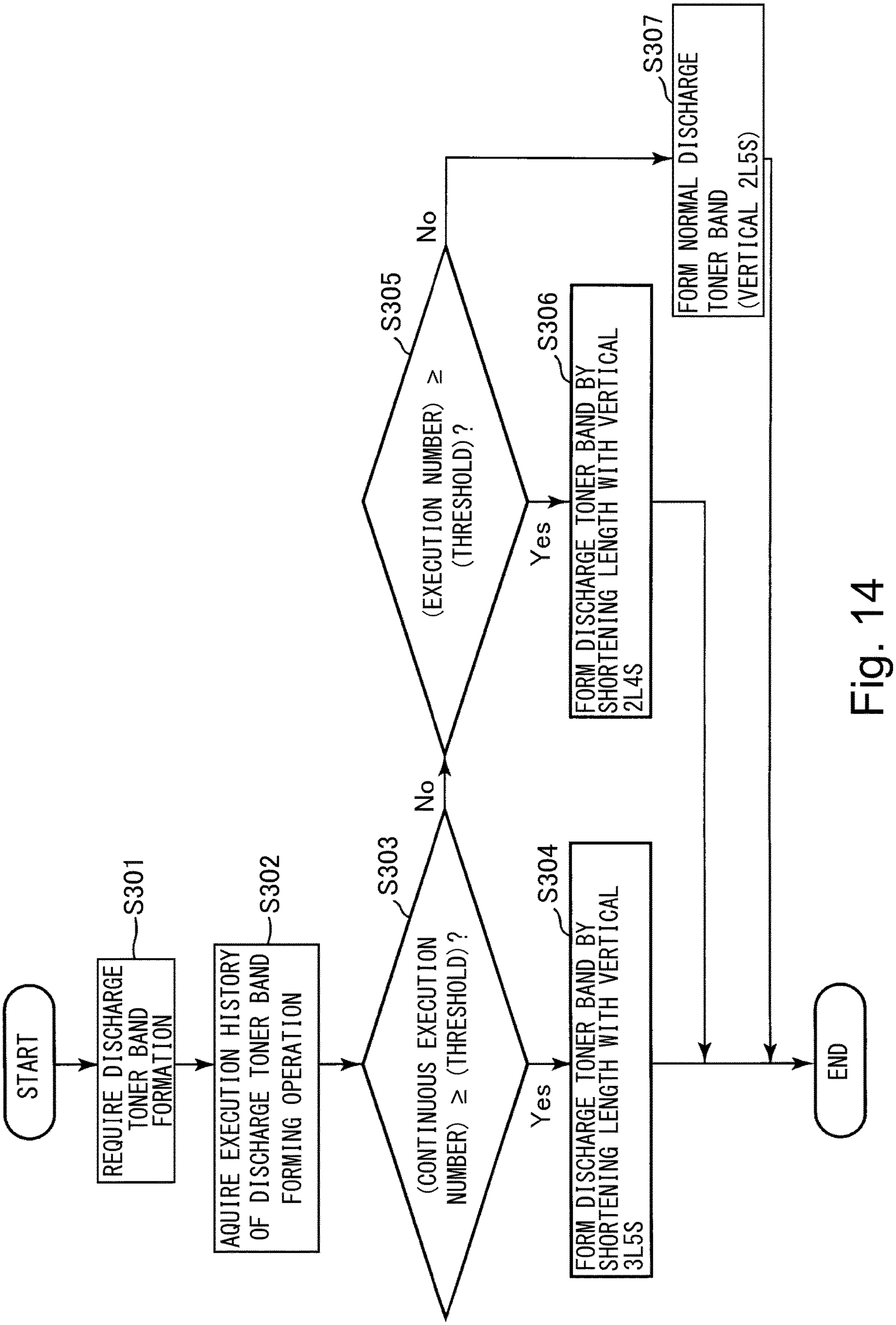

FIG. 14 is a flowchart of control for changing a pattern of a discharge toner band.

DESCRIPTION OF THE EMBODIMENTS

In the following, an image forming apparatus according to the present invention will be specifically described with reference to the drawings.

Embodiment 1

1. General Constitution and Operation of Image Forming Apparatus

Figure 1:
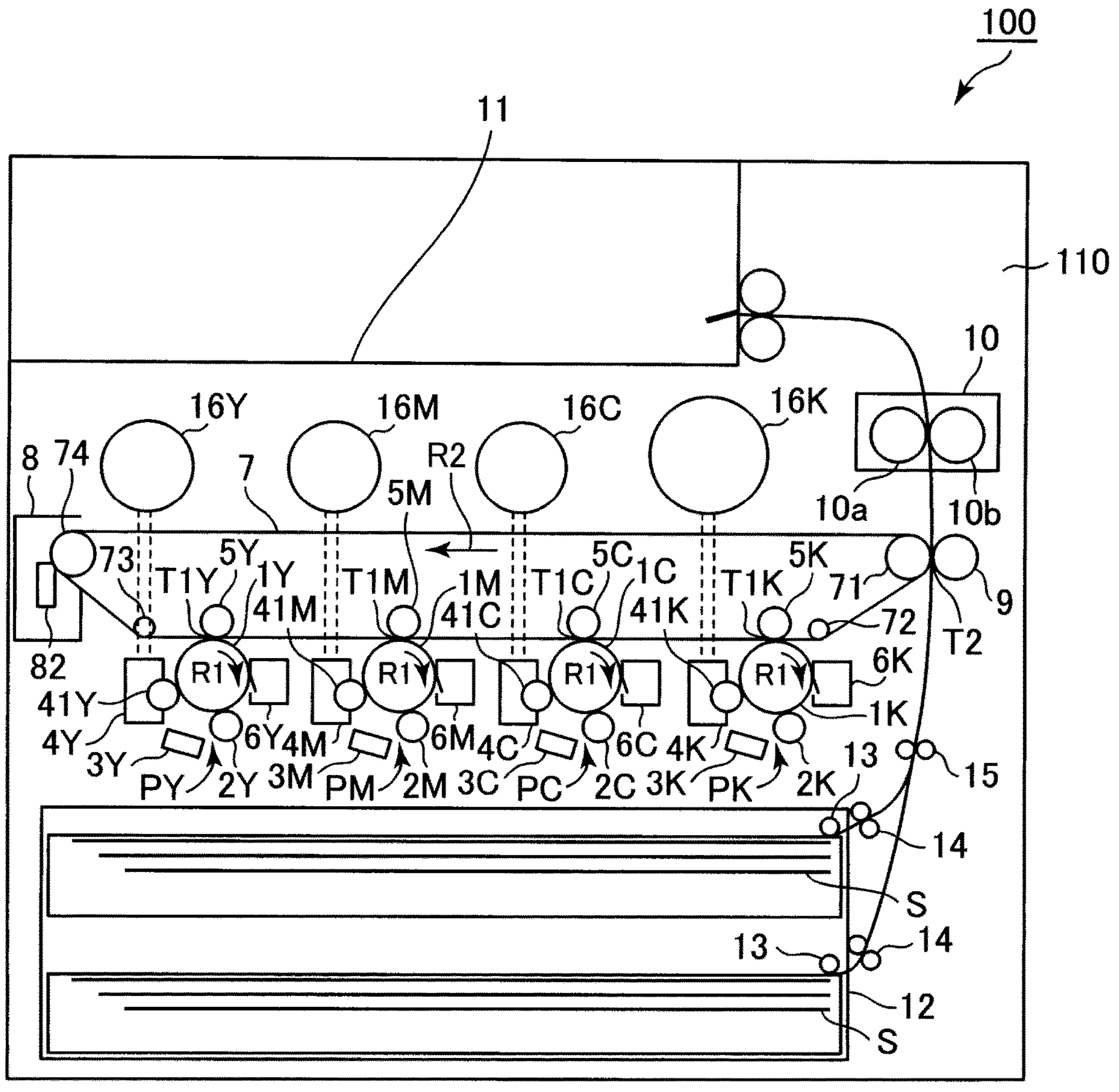
FIG. 1 is a schematic sectional view of an image forming apparatus.

FIG. 1 is a schematic sectional view of an image forming apparatus 100 of an embodiment 1. The image forming apparatus 100 of this embodiment is a tandem laser beam printer which is capable of forming a full-color image with use of an electrophotographic type and which employs an intermediary transfer type.

The image forming apparatus 100 includes, as a plurality of image forming portions (stations), first to fourth image forming portions PY, PM, PC, and PK for forming images of yellow (Y), magenta (M), cyan (C), and black (K), respectively. The first to fourth image forming portions PY, PM, PC, and PK are provided and arranged linearly in a named order along a movement direction of an image transfer surface of an intermediary transfer belt 7 described later. Incidentally, elements which are provided for the respective colors and which have the same or corresponding functions or constitutions are collectively described in some instances by omitting suffixes Y, M, C and K of reference numerals or symbols indicating constituent elements for either of the colors. In this embodiment, the image forming portion P (PY, PM, PC, PK) is constituted by including a photosensitive drum 1 (1Y, 1M, 1C, 1K), a charging roller 2 (2Y, 2M, 2C, 2K), a developing device 4 (4Y, 4M, 4C, 4K), a primary transfer roller 5 (5Y, 5M, 5C, 5K), a drum cleaning device 6 (6Y, 6M, 6C, 6K), and the like which are described later.

The photosensitive drum 1 which is a rotatable drum-shaped (cylindrical) photosensitive member (electrophotographic photosensitive member) as a first image bearing member is rotationally driven in an arrow R1 direction (clockwise direction) in FIG. 1 at a predetermined peripheral speed (process speed).

The surface of the rotating photosensitive drum 1 is electrically charged substantially uniformly to a predetermined polarity (negative in this embodiment) and to a predetermined potential by the charging roller 2 which is a roller-shaped charging member as a charging means. The charging roller 2 is provided in contact with the surface of the photosensitive drum 1 and is rotated with rotation of the photosensitive drum 1. During charging, to the charging roller 2, a predetermined charging voltage (charging bias) including a DC component of the same polarity as a charge polarity (negative in this embodiment) of the photosensitive drum 1 is applied by a charging power source (not shown) as a charging voltage applying means.

Incidentally, with respect to a rotational direction of the photosensitive drum 1, on each of sides upstream and downstream of a contact portion between the photosensitive drum 1 and the charging roller 2, a minute gap between the photosensitive drum 1 and the charging roller 2 is formed. The charging roller 2 electrically charges the surface of the photosensitive drum 1 by electric discharge generating in at least one of these gaps on the sides upstream and downstream of the contact portion.

The charged surface of the photosensitive drum 1 is subjected to scanning exposure by being irradiated with laser light on the basis of image information by the exposure device (laser scanner) 3 as an exposure means, so that an electrostatic latent image (electrostatic image) is formed on the photosensitive drum 1.

The electrostatic latent image formed on the photosensitive drum 1 is developed (visualized) by being supplied with the toner of a developer by the developing device 4 as a developing means, so that a toner image (developer image) is formed on the photosensitive drum 1. The developing device 4 includes a developing sleeve 41 as a developer carrying member (developing member) for feeding (conveying) the developer to a portion opposing the photosensitive drum 1 while carrying the developer thereon. During development, to the developing sleeve 41, a predetermined developing voltage (developing bias) including a DC component of the same polarity as the charge polarity (negative in this embodiment) of the photosensitive drum 1 is applied by a developing power source (not shown) as a developing voltage applying means. In this embodiment, to the developing sleeve 41, as the developing voltage, an oscillating voltage in the form of superimposition of a DC voltage and an AC voltage is applied. In this embodiment, the toner image is formed by image portion exposure and reverse development. That is, on an exposure portion (image portion) on the photosensitive drum 1 where an absolute value of the potential is lowered by the exposure to light after the photosensitive drum surface is substantially uniformly charged, the toner charged to the same polarity (negative in this embodiment) as the charge polarity of the photosensitive drum 1 is deposited. In this embodiment, a normal charge polarity of the toner which is a principal charge polarity of the toner during the development is the negative polarity. The developing device 4 will be further described later.

The intermediary transfer belt 7 which is an intermediary transfer member formed of an endless belt as a second image bearing member is provided. The intermediary transfer belt 7 is extended around a plurality of supporting rollers (stretching rollers) 71 to 74 and is stretched under a predetermined tension imparted thereto. To the intermediary transfer belt 7, a driving force is transmitted by rotationally driving a driving roller 71 which is one of the supporting rollers, so that the intermediary transfer belt 7 is rotated (circulated) in an arrow R2 direction (counterclockwise direction) in FIG. 2 at a peripheral speed (process speed) corresponding to the peripheral speed of the photosensitive drum 1. On an inner peripheral surface (back surface) side of the intermediary transfer belt 7, correspondingly to the photosensitive drums 1Y, 1M, 1C, and 1K, the primary transfer rollers 5Y, 5M, 5C, and 5K which are roller-shaped primary transfer members as primary transfer means are provided, respectively. Each primary transfer roller 5 is pressed toward the photosensitive drum 1 via the intermediary transfer belt 7, and forms a primary transfer portion (primary transfer nip) T1 where the intermediary transfer belt 7 and the photosensitive drum 1 are in contact with each other.

The toner image formed on the photosensitive drum 1 is transferred (primary-transferred) onto the intermediary transfer belt 7 as a rotating toner image receiving member by the action of the primary transfer roller 5 in the primary transfer portion T1. During primary transfer, to the primary transfer roller 5, a predetermined primary transfer voltage (primary transfer bias) of an opposite polarity (positive in this embodiment) to the normal charge polarity of the toner is applied from a primary transfer power source (not shown) as a primary transfer voltage applying means. For example, during full-color image formation, the toner images of the colors of Y, M, C and K formed on the respective photosensitive drums 1 are successively transferred superposedly onto the intermediary transfer belt 7 in the respective primary transfer portions T1. In this embodiment, each image forming portion P constitutes an image forming means for forming the toner image on the intermediary transfer belt 7.

On an outer peripheral surface (front surface) side of the intermediary transfer belt 7, in a position opposing the driving roller 71, a secondary transfer roller (outer secondary transfer roller) 9 is provided. The secondary transfer roller 9 is pressed toward the driving roller 71 functioning as an opposite roller (inner secondary transfer roller) via the intermediary transfer belt 7, and forms a secondary transfer portion (secondary transfer nip) T2 where the intermediary transfer belt 7 and the secondary transfer roller 9 are in contact with each other. The toner images formed on the intermediary transfer belt 7 are transferred (secondary-transferred) onto the recording material S as a toner image receiving member nipped and conveyed between the intermediary transfer belt 7 and the secondary transfer roller 9 by the action of the secondary transfer roller 9 in the secondary transfer portion T2. During secondary transfer, to the secondary transfer roller 9, a predetermined secondary transfer voltage (secondary transfer bias) of an opposite polarity (positive in this embodiment) to the normal charge polarity of the toner is applied by a secondary transfer power source (not shown) as a secondary transfer voltage applying means. The recording material S are selectively fed one by one from the cassette 12 as a recording material accommodating portion by a pick-up roller (feeding roller) 13 and the like as a feeding member, and the recording material S fed from the cassette 12 is conveyed to a registration roller pair 15 as a synchronous conveying member by a conveying roller pair 14 as a conveying member. The cassette 12 is provided at a lower portion of an apparatus main assembly 110 of the image forming apparatus 100 so as to be detachably mountable to the apparatus main assembly 110. Then, the recording material S is conveyed to the secondary transfer portion T2 by the registration roller pair 15 so as to be timed to the toner images on the intermediary transfer belt 7. Incidentally, as the recording material S, for example, various materials such as plain paper, a synthetic resin sheet, and an envelope are usable, but in this embodiment, the recording material S will be described as the plain paper.

The recording material S on which the toner images are transferred is conveyed to the fixing device 10 as a fixing means. The fixing device 10 is constituted by including a fixing roller 10*a* provided with a heating means and a pressing roller 10*b* press-contacted to the fixing roller 10*a*. In a process in which the recording material S is nipped and conveyed by the fixing roller 10*a* and the pressing roller 10*b*, the fixing device 10 heats and presses the recording material S on which the unfixed toner image is carried, and fixes (melts, sticks) the toner image on the recording material S. A temperature of the fixing device 10 (fixing roller 10*a*) is determined on the basis of a detection result of an environmental temperature by an environment sensor (not shown) provided in the image forming apparatus 100 and setting of a kind (paper kind) of the recording material S. In general, when a process speed is the same, the temperature of the fixing device 10 is set at a higher value with a lower environmental temperature and with a larger basis weight of paper set as the paper kind. In this embodiment, for example, as the paper kind, plain paper 1, plain paper 2, plain paper 3, and the like are settable, and basis weights of the plain paper 1, the plain paper 2, and the plain paper 3 are 64 to 75 $g/m^2$, 76 to 90 $g/m^2$, and 91 to 105 $g/m^2$, respectively. Further, the temperatures of the fixing device 10 set for the plain paper 1, the plain paper 2, and the plain paper 3, for example in the case of the environmental temperature of 23° C. are 190° C., 200° C., and 210° C., respectively. The recording material S passed through the fixing device 10 is discharged (outputted) to a discharge tray 11 as a discharge portion provided outside the apparatus main assembly 110 of the image forming apparatus 100.

The surface of the photosensitive drum 1 after a primary transfer step is cleaned by the drum cleaning device 6 as a photosensitive member cleaning means. That is, a deposited matter such as toner (transfer residual toner) remaining on the photosensitive drum 1 without being transferred onto the intermediary transfer belt 7 during the primary transfer is removed and collected from the photosensitive drum 1 by the drum cleaning device 6. The drum cleaning device 6 scrapes off and removes the deposited matter such as the primary transfer residual toner from the surface of the rotating photosensitive drum 1 by a cleaning blade as a cleaning member provided in contact with the surface of the photosensitive drum 1, and then accommodates the deposited matter in a cleaning container.

Further, on the outer peripheral surface side of the intermediary transfer belt 7, in a position opposing a tension roller 74 which is one of the supporting rollers, a belt cleaning device 8 as an intermediary transfer member cleaning means is provided. Incidentally, the belt cleaning device 8 may only be required to be disposed on a side downstream of the secondary transfer portion T2 and upstream of the primary transfer portion T1 (the mostupstream primary transfer portion T1Y) with respect to the rotational direction of the intermediary transfer belt 7. Further, the tension roller 74 is urged from the inner peripheral surface side toward the outer peripheral surface side of the intermediary transfer belt 7 and imparts tension to the intermediary transfer belt 7. The surface of the intermediary transfer belt 7 after a secondary transfer step is cleaned by the belt cleaning device 8. That is, deposited matters such as toner (secondary transfer residual toner) remaining on the intermediary transfer belt 7 without being transferred onto the recording material S during the secondary transfer and paper powder or the like deposited on the intermediary transfer belt 7 during the secondary transfer are removed and collected from the intermediary transfer belt 7 by the belt cleaning device 8. The belt cleaning device 8 scrapes off and removes the deposited matters such as the secondary transfer residual toner and the like from the surface of the rotating intermediary transfer belt 7 by the cleaning blade 82 provided in contact with the intermediary transfer belt 7, and then accommodates the deposited matters in a cleaning container. The belt cleaning device 8 will be specifically described later.

Further, to the developing devices 4Y, 4M, 4C, and 4K, toners in amounts corresponding to amounts of the toners consumed by the development are supplied from toner bottles 16Y, 16M, 16C, and 16K, respectively.

Here, the intermediary transfer belt 7 is constituted by a rubber material, a resin material, or the like. In this embodiment, as the intermediary transfer belt 7, a single-layer structure belt molded in an endless shape by using PEEK (polyether ether ketone) which is the resin material was used. An electric resistance of the intermediary transfer belt 7 is adjusted so that for example, a surface resistivity is $1\times10^{12}$ [Ω/□] and volume resistivity is $1\times10^{9}$ [Ω·cm], by dispersing carbon black in a base material of the resin. Further, onto the surface of the intermediary transfer belt 7, a lubricant is applied for reducing a friction resistance of the surface of the intermediary transfer belt 7 in an initial state of use. As the lubricant, kaina, zinc stearate, or the like is widely used, but in this embodiment, the zinc stearate was applied. By applying powdery zinc stearate in a state of a mixture liquid in which the powdery zinc stearate is mixed in a volatile solvent (HEF in this embodiment) in a predetermined ratio, so that the zinc stearate can be uniformly applied efficiently onto the surface of the intermediary transfer belt 7.

2. Developing Device

Figure 2:
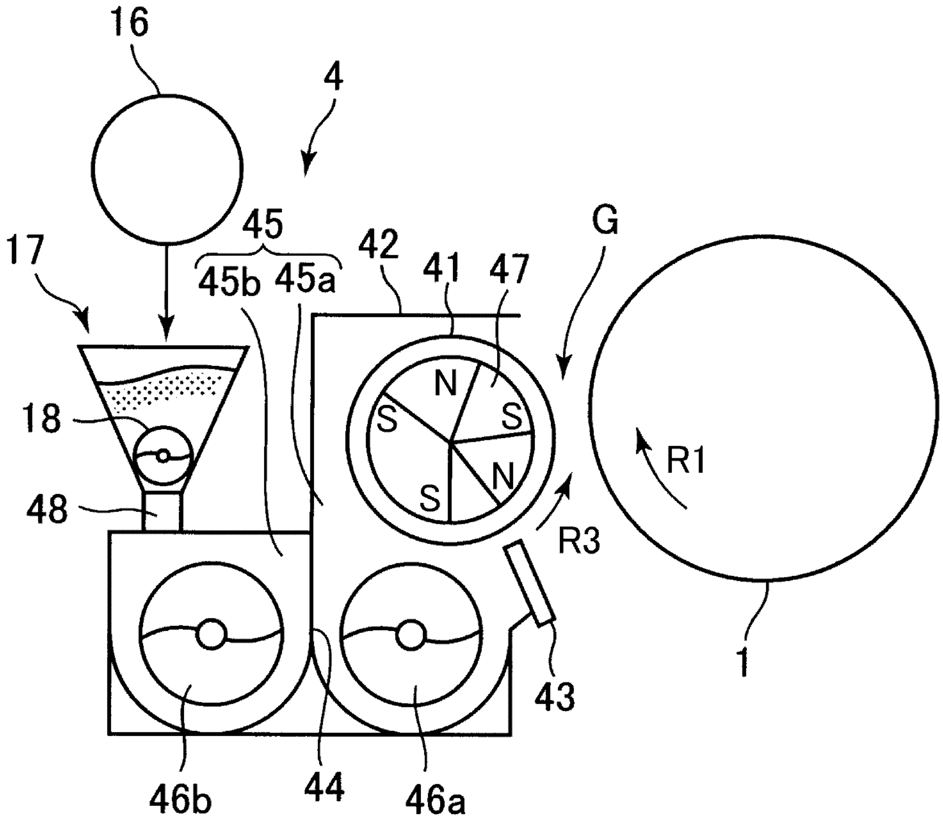
FIG. 2 is a schematic sectional view of a developing device.

Next, the developing device 4 will be further described. FIG. 2 is a schematic sectional view of the developing device 4.

In this embodiment, the developing device 4 includes a developing container 42. In the developing container 42, as the developer, a two-component developer containing the toner (non-magnetic toner particles) and the carrier (magnetic carrier particles) is accommodated. Further, the developing device 4 includes, in the developing container 42, the developing sleeve 41 as the developer carrying member (developing member) and an ear (chain)-cutting member as a regulating member for regulating an ear (chain) of the developer carried on the developing sleeve 41. In this embodiment, a developer accommodating portion 45 provided inside the developing container 42 is laterally partitioned into a developing chamber 45*a* and a stirring chamber 45*b* with respect to a substantially horizontal direction by a partition wall 44 extending in a substantially perpendicular direction to the surface of the drawing sheet of FIG. 2. Further, the developer is accommodated in the developing chamber 45*a* and the stirring chamber 45*b*. In the developing chamber 45*a* and the stirring chamber 45*b*, a first conveying screw 46*a* and a second conveying screw 46*b* which are stirring and conveying members as stirring and conveying means are provided, respectively. The first conveying screw 46*a* is disposed substantially parallel to a rotational axis direction of the developing sleeve 41 at a bottom of the developing chamber 45*a*, and conveys the developer in the developing chamber 45*a* in one direction along the rotational axis direction by being rotated. Further, the second conveying screw 46*b* is disposed substantially parallel to the first conveying screw 46*a* at a bottom of the stirring chamber 45*b*, and conveys the developer in the stirring chamber 45*b* in a direction opposite to the direction by the first conveying screw 46*a*. Thus, by conveyance of the developer through rotation of the first and second conveying screws 46 and 46*b*, the developer is circulated between the developing chamber 45*a* and the stirring chamber 45*b* through openings (i.e., communicating portions) formed at opposite end portions of the partition wall 44. In this embodiment, the developing chamber 45*a* and the stirring chamber 45*b* are disposed along a substantially horizontal direction, but may be disposed, for example, along an up-down direction substantially vertically or in a positional relationship between the horizontal direction and the vertical direction.

In this embodiment, the developing container 42 is provided with an opening at a position corresponding to a developing region G opposing the photosensitive drum 1, and the developing sleeve 41 is disposed rotatably with a predetermined interval between itself and the photosensitive drum 1 so as to be partially exposed toward the photosensitive drum 1 through this opening. The developing device 4 carries out development in a state in which the developer on the developing sleeve 41 conveyed to the developing region G is contacted to the photosensitive drum 1. This developing sleeve 41 is constituted by a non-magnetic material such as aluminum or stainless steel, and inside thereof, a magnet roller 47 which is a magnetic field generating means is non-rotationally provided. The developing sleeve 41 is rotationally driven in an arrow R3 direction (counterclockwise direction) in FIG. 4, and carries the two-component developer regulated in layer thickness by ear (chain) cutting of a magnetic brush by the ear-cutting member 43. The developing sleeve 41 conveys the developer regulated in layer thickness to the developing region G opposing the photosensitive drum 1, and supplies the toner to the electrostatic latent image formed on the photosensitive drum 1, so that the electrostatic latent image is developed. At this time, in order to improve developing efficiency, i.e., an imparting rate of the toner to the electrostatic latent image, to the developing sleeve 41, a developing voltage (developing bias) in the form of superimposition of a DC voltage and an AC voltage is applied from a developing power source (not shown). The ear-cutting member 43 is constituted by a non-magnetic member (regulating blade) formed of a plate-shaped aluminum material extending along the rotational axis direction of the developing sleeve 41. Further, the ear-cutting member 43 is disposed upstream of the photosensitive drum 1 with respect to the rotational direction of the developing sleeve 41. Further, the developer (the toner and the carrier) passes through between a free end of the ear-cutting member 43 and the developing sleeve 41 and is sent to the developing region G. In this embodiment, in the developing region G, the developing sleeve 41 is rotated so that a surface movement direction thereof is the same direction as a surface movement direction of the photosensitive drum 1. A peripheral speed of the developing sleeve 41 can be made faster than a peripheral speed of the photosensitive drum 1.

At an upper portion of the developing device 4, a hopper 17 which is a supplying device as a supplying means is provided. The hopper 17 accommodates a supply developer (toner or a supply two-component developer) supplied from the toner bottle 16 as a supply container. The hopper 17 is provided with a supplying screw 18 as a supplying member at a lower portion thereof, and one end portion of the supplying screw 18 extends to a position of a supply opening 48 provided at one end portion of the developing device 4 with respect to a longitudinal direction of the developing device 4 (substantially parallel to the rotational axis direction of the photosensitive drum 1). The toner in an amount corresponding to an amount of the toner consumed by the image formation passes through the supply opening 48 from the hopper 17 by a conveying force by rotation of the supplying screw 18 and by gravity acting on the supply developer, and thus is supplied to the developing container 42. In this embodiment, a supply amount of the supply developer is set depending on the number of times of rotations of the supply screw 18. This number of times of rotations is set by a controller 200 (FIG. 4) described later, on the basis of a video count value of image data described later.

3. Developer

Next, the developer in this embodiment will be further described. As described above, in this embodiment, the developing device 4 develops the electrostatic latent image on the photosensitive drum 1 with use of a two-component developer as the developer in which the carrier (magnetic carrier particles) and the toner (non-magnetic toner particles) are mixed. In this embodiment, a developer in which the carrier and the toner are mixed in a weight ratio of 91:9 (toner content: 9%) was used. Further, in this embodiment, a total weight of an initial developer accommodated in the developing device 4 was 208 g.

In this embodiment, as the carrier, a carrier prepared by coating ferrite particles with a silicone resin was used. This carrier is 24 [$Am^2/kg$] in saturation magnetization to an applied magnetic field of 240 [kA/m]. Further, this carrier is $1\times10^7$ [Ω·cm] to $1\times10^8$ [Ω·cm] in specific resistance (resistivity) in a field intensity of 3000 [V/cm], and is 50 μm in weight-average particle size.

The toner is constituted by containing at least a binder resin, a colorant, and a charge control agent. In this embodiment, as a binder resin, a styrene-acrylic resin was used. However, the present invention is not limited thereto, and as the binder resin, it is also possible to use a styrene-based resin, a polyester-based resin, polyethylene-based resin, and the like. As the colorant, various pigments, various dyes, and the like are used. The colorant may be used singly or in combination of a plurality of kinds. The charge control agent may contain a charge controller for reinforcement as desired. As the charge controller for reinforcement, it is possible to utilize a nigrosine-based dye, a triphenylmethane-based dye, and the like.

The toner contains a wax. The wax is contained in the toner for improving a parting property from a fixing member (fixing roller 10*a*) during fixing and for improving a fixing property. As the wax, it is possible to use a paraffin wax, a carnauba wax, polyolefin wax, and the like, and the wax is used by being kneaded and dispersed in the binder resin. In this embodiment, as the toner, toner prepared by pulverizing a resin material in which the binder resin, the charge control agent, and the wax are kneaded and dispersed, by a mechanical pulverizer was used. A melting point of the wax used in this embodiment is 100° C. or less.

Further, to the toner, an external additive is externally added. As the external additive, it is possible to cite inorganic oxide fine particles such as hydrophobized amorphous silica or a titanium compound such as titanium oxide. These fine particles of the external additive is added to a base material (base particles) of the toner, so that power flowability and a charging amount of the toner are adjusted. An average particle size of the particles of the external additive may preferably be 1 nm or more and 100 nm or less. In this embodiment, the titanium oxide of 50 nm in average particle size was added to the base material of the toner in a weight ratio of 0.5 wt. %, and the amorphous silica fine particles of 2 nm and 100 nm in average particle size were added to the base material of the toner in weight ratios of 0.5 wt. % and 1.0 wt. %, respectively.

When the particle size of the toner in this embodiment as described above was measured by a powder particle size image analysis system ("FPIA-3000", manufactured by Sysmex Corp.), a weight-average particle size was 6.6 μm.

4. Best Cleaning Device

Figure 3:
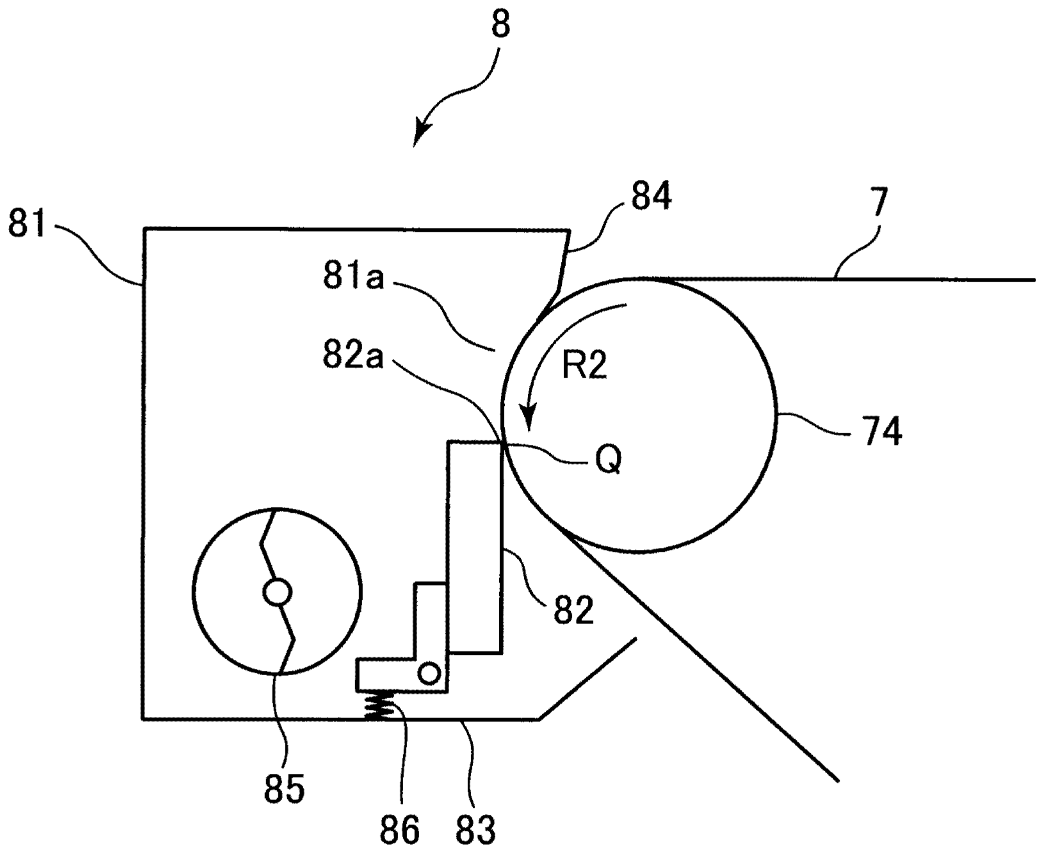
FIG. 3 is a schematic sectional view of a belt cleaning device.

Next, the belt cleaning device 8 in this embodiment will be further described. FIG. 3 is a schematic sectional view (cross section substantially perpendicular to the rotational axis directions of the photosensitive drum 1 and the supporting roller of the intermediary transfer belt 7) of the belt cleaning device 8 in this embodiment.

The belt cleaning device 8 includes a cleaning container (casing) 81 provided with an opening 81*a* on the intermediary transfer belt 7 side. A cleaning blade 82 as a cleaning member (herein, simply referred also to as a "blade") is provided and positioned at the opening 81*a* of the cleaning container 81. The blade 82 is constituted by a plate-like member having a predetermined thickness and a predetermined length in each of a longitudinal direction disposed along (in this embodiment, substantially parallel to) a direction (widthwise direction) substantially perpendicular to the surface movement direction of the intermediary transfer belt 7 and a short(-side) direction substantially perpendicular to the longitudinal direction. In this embodiment, the blade 82 is formed with an urethane rubber as an elastic material. The length of the blade 82 in the longitudinal direction is a length substantially equal to a length of an image forming region (toner image formable region) on the intermediary transfer belt 7 in the direction substantially perpendicular to the surface movement direction of the intermediary transfer belt 7 or over a region broader than the image forming region.

The blade 82 is fixed to a supporting member 83 at one end portion (fixed end portion) with respect to the short direction thereof. Further, the supporting member 83 is mounted to the cleaning container 81 so as to be rotatable (swingable) about a rotational axis substantially parallel to a direction substantially perpendicular to the surface movement direction of the intermediary transfer belt 7. Thus, the blade 82 is mounted to the cleaning container 81 via the supporting member 83 so as to be rotatable (swingable) relative to the cleaning container 81. Further, the blade 82 includes an edge portion 82*a* positioned on an outside of the cleaning container 81 at a free end thereof on the other end portion (free end portion) with respect to the short direction thereof, and the edge portion 82*a* is contacted to the surface of the intermediary transfer belt 7 at a portion where the intermediary transfer belt 7 is wound around the tension roller 74. Further, the supporting member 83 is urged by a pressing spring 86 which is an urging member as an urging means in a direction in which the supporting member 83 is rotated so as to press the edge portion 82*a* of the above-described blade 82 against the surface of the intermediary transfer belt 7. The blade 82 is contacted to the surface of the intermediary transfer belt 7 so that the blade 82 is directed in a counter direction to the surface movement direction of the intermediary transfer belt 7. That is, the blade 82 is contacted to the surface of the intermediary transfer belt 7 so that the end thereof on the free end side is directed to an upstream side of the surface movement direction of the intermediary transfer belt 7 during the image formation. A contact portion (nip) between the blade 82 (edge portion 82*a*) and the intermediary transfer belt 7 is a blade nip (cleaning portion, cleaning nip) Q.

Further, at the opening 81*a* of the cleaning container 81, on a side upstream of the blade 82 with respect to the surface movement direction of the intermediary transfer belt 7, a scooping sheet 84 as a contact member is mounted to the cleaning container 81. The scooping sheet 84 is constituted by a sheet-like member having a predetermined thickness and a predetermined length in each of a longitudinal direction disposed along (in this embodiment, substantially parallel to) a direction substantially perpendicular to the surface movement direction of the intermediary transfer belt 7 and the short direction substantially perpendicular to the longitudinal direction. In this embodiment, the scooping sheet 84 is formed with a flexible plastic sheet. The scooping sheet 84 is fixed to and supported by the cleaning container 81 at one end portion thereof with respect to the short direction thereof. Further, the scooping sheet 84 contacts the intermediary transfer belt 7 at an end thereof on a free end portion side with respect to the short direction thereof. The scooping sheet 84 contacts the intermediary transfer belt 7 so that the end thereof on the free end side is directed toward a downstream side of the surface movement direction of the intermediary transfer belt 7 during the image formation. The scooping sheet 84 not only drops the toner scraped off by the blade 82 in the cleaning container, but also suppresses back-flow of the toner toward the intermediary transfer belt 7 side.

Further, inside the cleaning container 81, a collected toner conveying screw 85 as a collected toner conveying member is provided. The collected toner conveying screw 85 conveys the toner collected in the cleaning container 81 by the blade 82 in the longitudinal direction (substantially parallel to a direction substantially perpendicular to the surface movement direction of the intermediary transfer belt 7) of the cleaning container 81. Then, the collected toner conveying screw 85 discharges the toner to the outside of the cleaning container 81 through a discharge opening (not shown) provided in the cleaning container 81. The toner discharged from the cleaning container 81 passes through a conveying path (not shown) provided in the image forming apparatus 100 and is conveyed toward a collecting toner box (not shown) provided in the image forming apparatus 100.

5. Control Mode

Figure 4:
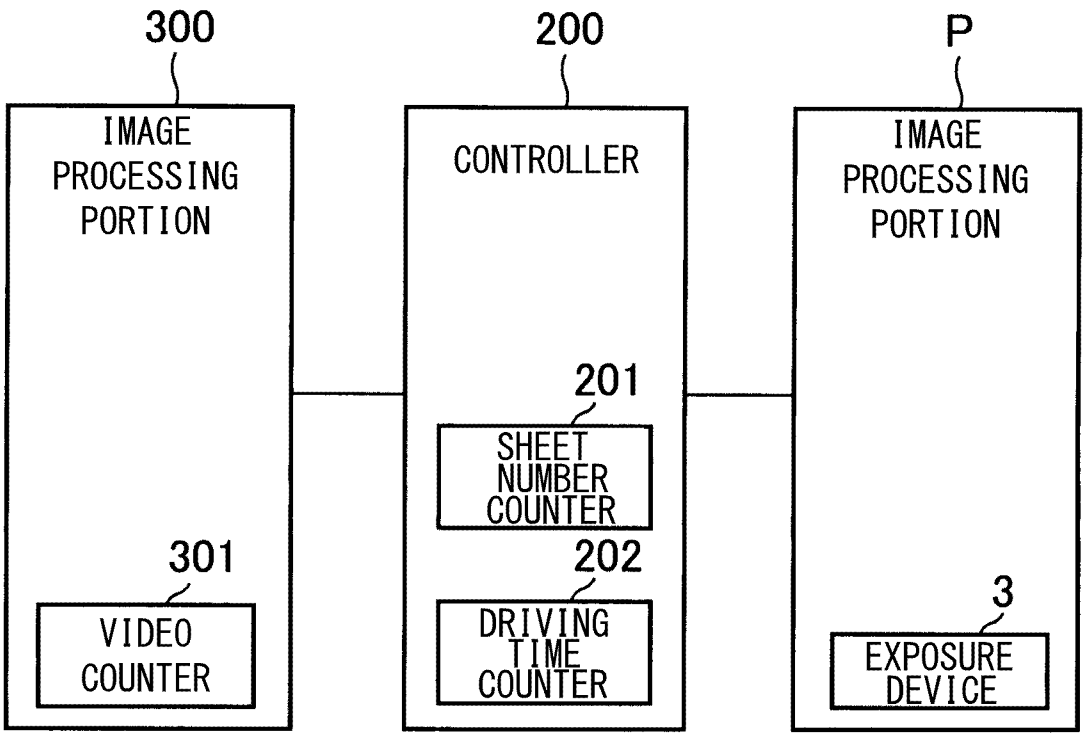
FIG. 4 is a schematic block diagram showing a control mode of the image forming apparatus.

FIG. 4 is a schematic block diagram showing a control mode of the image forming apparatus 100 of this embodiment. The image forming apparatus 100 includes a controller 200 as a control means. The controller 200 includes a CPU as a calculating means which is a central unit for performing arithmetic processing, a ROM, a RAM, and a non-volatile memory as a storing means (storing medium), an input/output circuit as an input/output portion, and the like means. In the ROM, a control program, a data table acquired in advance, and the like are stored. In the RAM, information inputted to the controller 200, detected information, a calculation result, and the like are stored. The input/output circuit performs input and output of signals between the controller 200 and devices connected thereto.

To the controller 200, respective portions of the image forming apparatus 100 such as the image forming portion P including the exposure device 3 are connected. The controller 200 executes a job (image forming job) by controlling the respective portions of the image forming apparatus 100 on the basis of signals (start signal, image signal) inputted from an external device (not shown) such as a personal computer (information processing device) depending on an operation by a user (operator). The job is a series of operations started by a single starting signal so as to form image(s) on a single recording material S or a plurality of recording materials S.

Further, the controller 200 is provided with a sheet number counter 201 as a sheet number counting means for counting (storing) an image-formed sheet number (number of sheets subjected to image formation). Further, the controller 200 is provided with a driving time counter 202 as a driving time counting means for counting (storing) a driving time of the developing device 4 (rotation time of the developing sleeve 41). In this embodiment, the sheet number counter 201 and the driving time counter 202 are realized by the CPU and the non-volatile memory.

Further, to the controller 200, an image processing portion (video controller) 300 for generating image data used in image formation in the image forming apparatus 100 on the basis of the signal inputted from the external device is connected. To the image processing portion 300, a color image data is inputted as an RGB image data from the external device. The image processing portion 300 converts, in a LOG converting portion, brightness data of the inputted RGB image data into CMY density data (CMY image data) on the basis of a lookup table (LUT). Further, in a masking/UCR portion, the image processing portion 300 extracts a black (K) component data from the CMY image data and subjects CMKY image data to matrix calculation in order to correct color turbidity of a recording color material. Further, in a lookup table portion (LUT portion), the image processing portion 300 subjects the image data to density correction for each of colors of the inputted CMYK image data with use of a gamma lookup table (y lookup table) for matching the image data with an ideal gradation characteristic of the image forming apparatus 100. Further, in a pulse width modulation portion, the image processing portion 300 outputs a pulse signal with a pulse width corresponding to a level of the image data (image signal) inputted from the LUT portion. On the basis of this pulse signal, in the exposure device 3, a laser driver drives a laser light emitting element, and the photosensitive drum 1 is irradiated with laser light, so that an electrostatic latent image is formed on the photosensitive drum 1. Further, the image processing portion 300 is provided with a video counting portion 301 as a developer consumption amount information acquiring means (video counting means). The video counting portion 301 integrates levels (0 to 255 levels) for each pixel in 600 dpi of the image data inputted to the LUT portion in an amount corresponding to one image surface. This image data integration value is referred to as a video count value. This video count value becomes a maximum value of 1023 in the case where an output image is 255 level in all the image areas. Incidentally, instead of the video counting portion 301, by using a laser signal counting portion, it is also possible to acquire a video count value through calculation of the image signal from the laser driver in a similar manner.

6. Toner Band Forming Operation

Next, a toner band forming operation in this embodiment will be described. In this embodiment, the image forming apparatus 100 executes an operation of forming a lubricating toner band performing a function of a lubricant for suppressing occurrences of noises such as chattering noise and squeal, and turning-up of the blade 82 due to a poor slip between the blade 82 and the intermediary transfer belt 7. Further, in this embodiment, the image forming apparatus 100 executes an operation for forming a discharge toner band for discharging deteriorated toner in the developing device 4 when a low-print ratio image with a low print ratio is continuously formed. Incidentally, the print ratio is a ratio of an area of a print portion (image portion, portion where the toner is placed) in an image forming region, and is 100% in the case where a whole area of the image forming region is a solid image and is 0% in the case of a solid white image with no print portion. Further, in this embodiment, the toner band (lubricating toner band, discharge toner band) is formed in processes (charging, exposure, development) similar to those of the above-described normal image formation.

As a method of control in which whether or not the toner band (lubricating toner band, discharge toner band) forming operation should be executed is discriminated, an available method such as a well-known method can be appropriately used. In this embodiment, an example of the control in which whether or not the toner band (lubricating toner band, discharge toner band) forming operation should be executed is discriminated will be briefly described. Further, in this embodiment, the case where the toner band (lubricating toner band, discharge toner band) formed on the photosensitive drum 1 is transferred onto the intermediary transfer belt 7 and then is conveyed to the belt cleaning device 8 without being transferred onto the recording material S will be described.

6-1. Lubricating Toner Band Forming Operation

Figure 5:
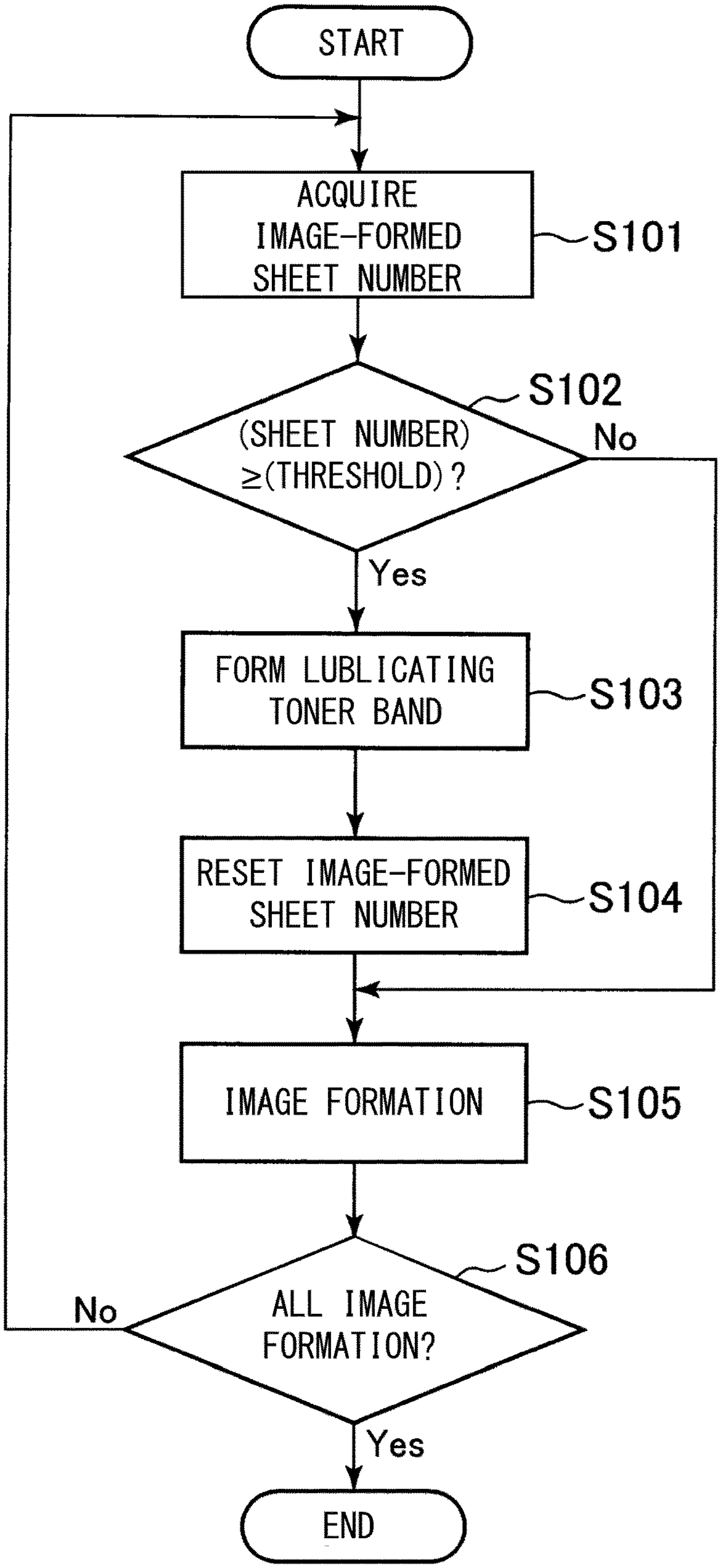
FIG. 5 is a flowchart of execution/non-execution discrimination control of a lubricating toner band forming operation.

First, the lubricating toner band forming operation will be described. In this embodiment, the image forming apparatus 100 executes the lubricating toner band forming operation for each predetermined image-formed sheet number. FIG. 5 is a flowchart of the control in which whether or not the lubricating toner band forming operation in this embodiment should be executed is discriminated. In this embodiment, the lubricating toner band is formed at the image forming portion PK for K (black).

When a job start signal is inputted, the controller 200 acquires a count value of the image-formed sheet number relating to control of the lubricating toner band forming operation, from the sheet number counter 201 (S101). Next, the controller 200 discriminates whether or not the image-formed sheet number is a predetermined threshold (for example, 100 sheets) (S102). In the case where the controller 200 discriminated in S102 that the image-formed sheet number is the threshold or more, the lubricating toner band is formed on the photosensitive drum 1 in a non-image forming region (region other than the image forming region). Then, this lubricating toner band is transferred onto the intermediary transfer belt 7 and is passed through the secondary transfer portion T2, and then is supplied to the edge portion 82*a* of the blade 82 of the belt cleaning device 8 (S103). Incidentally, in order to pass the lubricating toner band through the secondary transfer portion T2, the secondary transfer roller 9 can be spaced from the intermediary transfer belt 7, or to the secondary transfer roller 9, a voltage of the same polarity as the normal charge polarity of the toner can be applied. This is also true for a discharge toner band forming operation described later. In the case where the lubricating toner band is formed, the controller 200 resets the count value of the image-formed sheet number relating to the control of the lubricating toner band forming operation, to an initial value (zero in this embodiment) (S104). Thereafter, the controller 200 causes the image forming apparatus 100 to form the image (S105). Then, the controller 200 discriminates whether or not formation of all the images in the job is ended (S106), and the job returns to the process of S101 in the case where the image formation is not ended, and the job is ended in the case where the image formation is ended.

Further, in the case where the controller 200 discriminated in S102 that the image-formed sheet number is not the threshold or more (i.e., is less than the threshold), the job goes to the process of S105 without performing the lubricating toner band formation.

Incidentally, the lubricating toner band formation may be executed at any timing during non-image formation other than during image formation in which the image to be transferred onto the recording material S and then be outputted is formed. As during the non-image formation, during pre-rotation which is a period of a preparatory operation before the image formation in the job, during sheet interval which is a period corresponding to an interval between the image formation and subsequent image formation in the job, during post-rotation which is a period of a post-operation (preparatory operation) after the image formation in the job, and the like period exist. This is also true for the discharge toner band forming operation described later.

Further, on the basis of a result of discrimination of a level of a lubricating property between the blade 82 and the intermediary transfer belt 7, the lubricating toner band may be formed. For example, as described above, in the case where there is a need to slow the conveying speed of the recording material S as described above, or in the like case, when the rotational speed of the intermediary transfer belt 7 is made slow, a degree of lubrication between the blade 82 and the intermediary transfer belt 7 becomes poor in some instances. That is, in the case where thick paper or an OHP (overhead transparency) film is used, the conveying speed of the recording material S when the toner image is fixed is made slower than a conveying speed in the case of a normal print sheet (plain paper) in some instances. This is because the thick paper is large in heat capacity, and therefore, it takes a longer fixing time. Further, this is also because the OHP film is required that the toner is sufficiently melted thereon so as to be smoothly distributed on the OHP film. When the toner is not sufficiently smooth, during projection of the toner (toner image) on a projector, there is a possibility that light is scattered and thus beautiful color reproduction cannot be made. However, in recent years, with downsizing of the image forming apparatus, a sufficient space cannot be ensured between the secondary transfer position and the fixing device. Further, in the case where a distance between the secondary transfer position and the fixing device is shorter than a length of the recording material S with respect to a conveying (feeding) direction, simultaneously with execution of a fixing operation at a leading end portion of the recording material S, secondary transfer is executed at a trailing end portion of the recording material S. For this reason, in the case where there is a need to slow the conveying speed during the fixing as in the case where the recording material S is the OHT film or the thick paper, there is a need to similarly slow the rotational speed of the intermediary transfer belt 7. Further, in the case where the rotational speed of the intermediary transfer belt 7 is made slow depending on a kind of the recording material S, the lubricating toner band may be formed at a predetermined timing.

A pattern of the lubricating toner band will be specifically described later.

6-2. Discharge Toner Band Forming Operation

Figure 6:
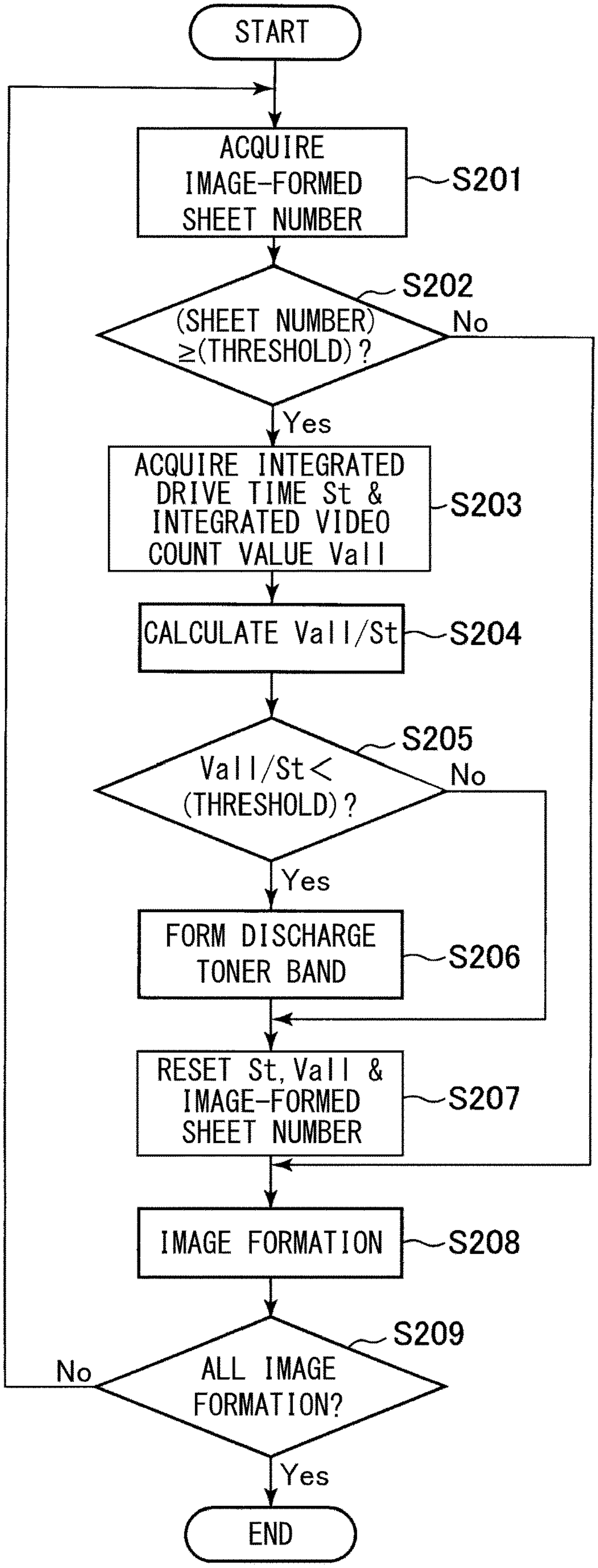
FIG. 6 is a flowchart of execution/non-execution discrimination control of a discharge toner band forming operation.

Next, the discharge toner band forming operation will be described. In this embodiment, every predetermined image-formed sheet number, on the basis of a driving time of the developing device 4 (rotation time of the developing sleeve 41) and a video count value, the image forming apparatus 100 discriminates whether or not the discharge toner band forming operation should be executed, and executes the discharge toner band forming operation as needed. FIG. 6 is a flowchart of control in which whether or not the discharge toner band forming operation in this embodiment should be executed is discriminated. Incidentally, in this embodiment, description will be made by paying attention to one image forming portion P as a representative, but similar control is carried out for each of the image forming portions P.

When a job start signal is inputted, the controller 200 acquires a count value of the image-formed sheet number relating to control of the discharge toner band forming operation, from the sheet number counter 201 (S201). Next, the controller 200 discriminates whether or not the image-formed sheet number is a threshold (for example, 100 sheets) or more (S202). In the case where the controller 200 discriminated in S202 that the image-formed sheet number is the threshold or more, the controller 200 acquires an integrated driving time St from the driving time counter 202 and an integrated video count value Vall from the video counting portion 301 (S203). Here, the integrated driving time St is an integrated value of the driving time of the developing device (rotation time of the developing sleeve 41) every predetermined image-formed sheet number (threshold) (in this case, the integrated driving time St may also include the driving times of the developing device 4 during the sheet interval and during the pre-rotation and the like). Further, the integrated video count value Vall is an integrated value of the video count value for each color every predetermined image-formed sheet number (threshold). Incidentally, the video count value may include, in addition to the video count value by image formation of a normal original, the video count value by formation of a control image (image for density control, toner supply control, color misregistration control, or the like). Next, the controller 200 calculates an index value Vall/St of a toner consumption amount per unit driving time on the basis of the integrated driving time St and the integrated video count value Vall (S204). This index value Vall/St correlates with an average print ratio per predetermined image-formed sheet number (threshold), i.e., a degree of deterioration of the toner in the developing device 4. Then, the controller 200 discriminate whether or not the index value Vall/St is less than a predetermined threshold (S205). In the case where the controller 200 discriminated in S205 that the index value Vall/St is less than the threshold, the controller 200 causes the image forming apparatus 100 to form the discharge toner band on the photosensitive drum 1 in a non-image forming region (region other than the image forming region). Then, the discharge toner band is transferred onto the intermediary transfer belt 7 and is passed through the secondary transfer portion T2, and then is supplied to the edge portion 82*a* of the blade 82 of the belt cleaning device 8 (S206). In this case, a toner consumption amount per unit driving time is small and thus discrimination that deterioration of the toner in the developing device 4 progresses can be made. Here, the threshold of the above-described index value Vall/St can be set in advance as an index value Vall/St at which there is a possibility that inconveniences (toner scattering, a fog, and the like) due to the deteriorated toner occur. Next, the controller 200 resets each of the integrated driving time St, the integrated video count value Vall, the count value of the image-formed sheet number relating to control of the discharge toner band forming operation to an initial value (zero in this embodiment) (S207). Thereafter, the controller 200 causes the image forming apparatus 100 to form the image (S208). Further, the controller 200 discriminates whether or not all image formation of the job is ended (S209). In the case where the whole image formation is not ended, the job returns to the process of S201, and in the case where all image formation is ended, the controller 200 ends the job.

Further, in the case where the controller 200 discriminated in S205 that the index value Vall/St is not less than the threshold (i.e., is the threshold or more), the job goes to the process of S207 without performing the discharge toner band formation.

This is because in this case, the toner consumption amount per unit driving time is sufficiently large, and thus discrimination that the deterioration of the toner in the developing device 4 does not progress can be made. Subsequent operations are similar to those described above.

Further, in the case where the controller 200 discriminated in S202 that the image-formed sheet number is not the threshold or more (i.e., is less than the threshold), the controller 200 does not execute the processes from S203 to S207, and the job goes to the process of S208. Subsequent operations are similar to those described above.

Incidentally, in this embodiment, the example of the control in which whether or not the discharge toner band forming operation should be performed is discriminated on the basis of the driving time of the developing device 4 (rotation time of the developing sleeve 41) and the video count value was described, but the present invention is not limited thereto. For example, as disclosed in JP-A 2011-48083, the control in which whether or not the discharge toner band forming operation should be performed is discriminated may also be carried out in the following manner. That is, in the case where the index value (video count value) of the toner consumption amount is lower than the predetermined threshold for each image formation, a difference between the threshold and the index value is calculated. Then, in the case where an integrated value obtained by integrating the calculated difference reached a predetermined value, the discharge toner band is formed. Further, for example, an average print ratio in a predetermined period (every predetermined image formed sheet number or the like) is calculated on the basis of the image data or the like, and in the case where the calculated average print ratio is less than a predetermined threshold, the discharge toner band forming operation may be executed. Also, by such control, depending on a degree of the deterioration of the toner in the developing device 4 due to the print ratio of the image formed, the discharge toner band can be formed.

A pattern of the discharge toner band will be specifically described later.

7. Improper Cleaning of Toner Band

Figure 7:
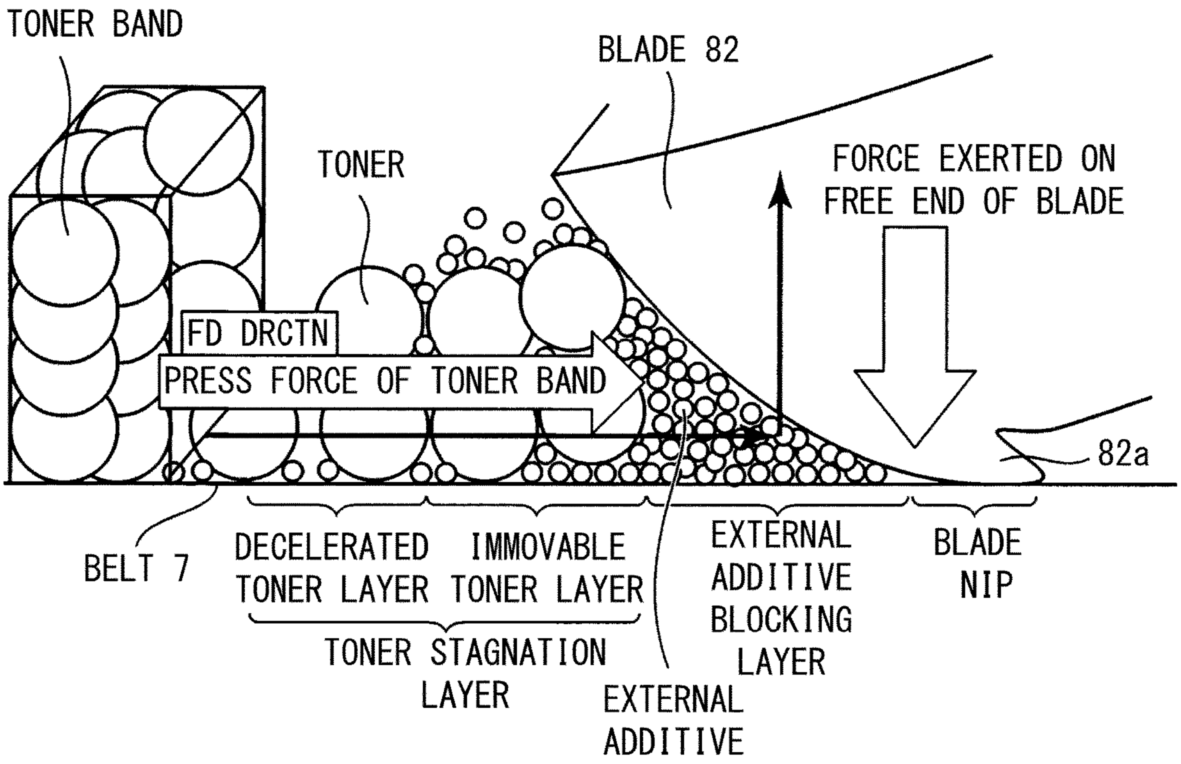
FIG. 7 is a schematic view showing a mechanism of an occurrence of improper cleaning of a toner band.

Next, improper cleaning (cleaning failure) of the toner band (lubricating toner band, discharge toner band) will be described. FIG. 7 is a schematic view showing a neighborhood of a blade nip Q which is a contact portion between the blade 82 (edge portion 82*a*) and the intermediary transfer belt 7 in an enlarged manner. Incidentally, in relation to the belt cleaning device 8, "upstream" and "downstream" mean upstream and downstream, respectively, with respect to the surface movement direction of the intermediary transfer belt 7 even in the case where these terms are not particularly described explicitly. Further, herein, the surface movement direction of the intermediary transfer belt 7 is also referred to as a "conveying direction (feeding direction)", and the direction (widthwise direction) substantially perpendicular to the surface movement direction of the intermediary transfer belt 7 is also referred to as a "longitudinal direction". The longitudinal direction corresponds to a main scan direction (substantially parallel to the rotational axis direction of the photosensitive drum 1) of the exposure device 3, and the feeding direction corresponds to a sub-scan direction (substantially parallel to the surface movement direction of the photosensitive drum 1) of the exposure device 3.

To the blade 82, a force for bringing the free end of the blade 82 on the free end potion side into contact with the intermediary transfer belt 7 is applied. By this, the transfer residual toner on the intermediary transfer belt 7 and the toner of the toner band are blocked by the blade 82, so that cleaning of the intermediary transfer belt 7 is performed. In the neighborhood of the blade nip Q on an upstream side, an "external additive blocking layer" formed by blocking an external additive liberated from the toner by the blade 82 exists. Further, on a side upstream of the external additive blocking layer, an "immovable toner layer" formed by blocking the transfer residual toner and the toner of the toner band exists. Further, on a side upstream of the immovable toner layer, a "decelerated toner layer" formed by collision of the transfer residual toner and the toner of the toner band which are deposited on the intermediary transfer belt 7 and which are then moved from the upstream side to the downstream side, with the immovable toner layer and thus by decelerating a moving speed of the transfer residual toner and the toner of the toner band. Incidentally, a combination of the decelerated toner layer and the immovable toner layer is referred to as a "toner stagnation layer".

When the toner band (lubricating toner band, discharge toner band) is formed on the intermediary transfer belt 7, the toner of the toner band is pushed into the toner stagnation layer. By a force for pushing the toner of the toner band into the toner stagnation layer, a force for pushing up the blade 82 generates. When this force for pushing up the blade 82 becomes larger than a force for pushing the free end of the blade 82 to the intermediary transfer belt 7, the toner of the toner stagnation layer and the toner of the toner band push up the blade 82 and pass through the blade 82, so that improper cleaning of the toner band occurs. Further, as described above, the toner band (lubricating toner band, discharge toner band) is, in general, formed over a substantially whole area of the image forming region in the longitudinal direction substantially perpendicular to the feeding direction of the intermediary transfer belt (herein, this area is simply referred to as a "longitudinal whole area (region) "). In the case where the toner band exists in the longitudinal whole area, the improper cleaning of the toner band is liable to occur due to pushing-up of the blade 82 by the toner of the toner band in the longitudinal whole area.

Figure 8:
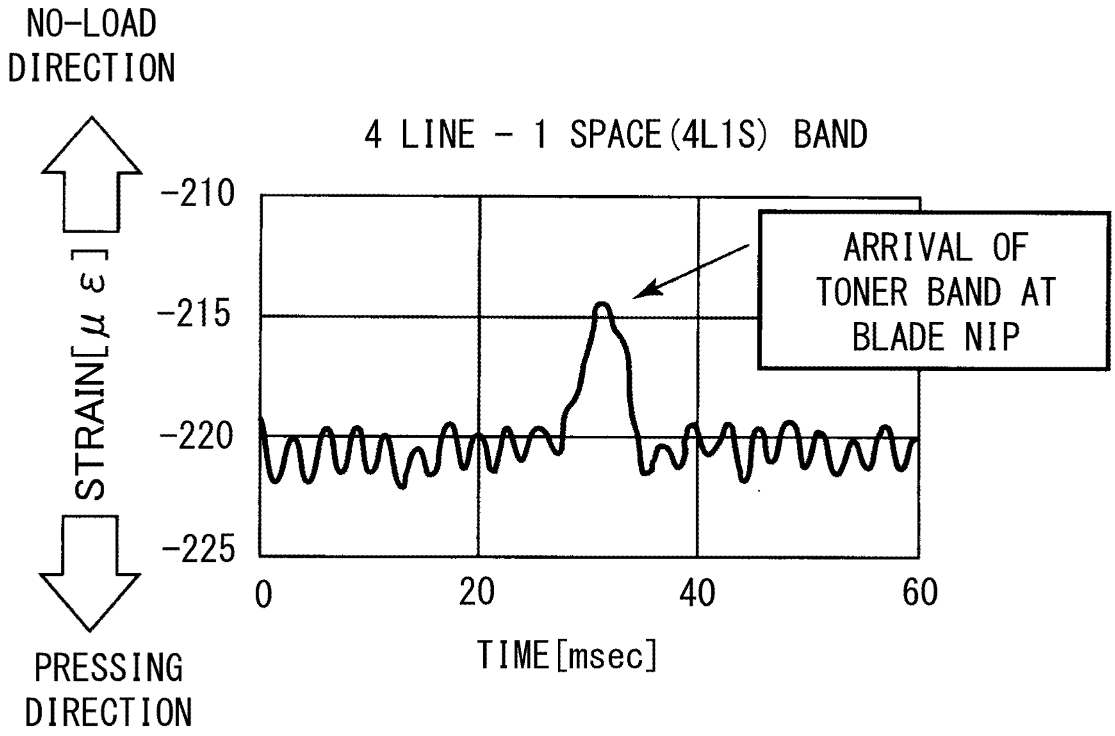
FIG. 8 is a graph showing strain (distortion) of a cleaning blade when the improper cleaning of the toner band occurs.

Here, strain (distortion) of the blade 82 due to the toner band (lubricating toner band, discharge toner band) will be described. FIG. 8 is a graph showing an example of a measurement result of strain of the blade 82 by using a strain gauge when the toner band is formed on the intermediary transfer belt 7 and is supplied to the edge portion 82*a* of the blade 82. As the toner band (lubricating toner band, discharge toner band), a pattern of lateral 4Line-1Space formed repetitively in the longitudinal whole area with respect to the feeding direction was used. The lateral 4Line-1 Space pattern was repetitively formed over 2 mm in the feeding direction for the lubricating toner band and over 210 mm in the feeding direction for the discharge toner band. Incidentally, the lateral 4Line-1Space pattern refers to a pattern comprising a print portion (image portion) of 4 dots in the feeding direction and a non-print portion (non-image portion) of 1 dot adjacent to the print portion with respect to the feeding direction. As shown in FIG. 8, it is understood that at a timing when the toner band reaches the blade nip Q, strain of the blade 82 generates in an opposite direction to a direction in which the blade 82 is pressed toward the intermediary transfer belt 7 (herein, this opposite direction is also referred to as a "no-load direction"). This is true for either one of the lubricating toner band and the discharge toner band.

As shown in FIG. 8, a time in which the strain generates in the no-load direction of the blade 82 is about 10 msec in the case where the process speed (image forming speed) is 200 m/sec, and is about 2 mm in the feeding direction in terms of a distance. The lubricating toner band is formed over 2 mm in the feeding direction, and therefore, the strain generates with respect to the no-load direction of the blade 82 in a whole area of the lubricating toner band in the feeding direction, so that the lubricating toner band causes the improper cleaning in the whole area thereof with respect to the feeding direction.

Further, the discharge toner band is formed over 210 mm in the feeding direction, but an area in which the strain in the no-load direction of the blade 82 is about 2 mm at the leading end portion of the discharge toner band in the feeding direction. For that reason, a distance in the feeding direction in which the improper cleaning occurs is also about 2 mm at the leading end portion of the discharge toner band in the feeding direction. This would be considered for the following reason. That is, the discharge toner band is pushed into the toner stagnation layer as shown in FIG. 7, and therefore, the force for pushing up the blade 82 becomes largest at the leading end portion of the discharge toner band in the feeding direction. By this, the toner of the toner stagnation layer and the toner of the discharge toner band at the leading end in the feeding direction pass through the blade 82, so that about 2 mm of the improper cleaning occurs in the feeding direction. Further, the toner of the toner stagnation layer and the toner of the discharge toner band pass through the blade 82, so that the toner of the toner stagnation layer is eliminated, and therefore, the force for pushing up the blade 82 lowers, and thus the blade 82 is pressed toward the intermediary transfer belt 7. For that reason, even when the discharge toner band is formed over 210 mm in the feeding direction, only in about 2 mm of the leading end portion in the feeding direction, the strain of the blade 82 in the no-load direction occurs, so that about 2 mm of the improper cleaning occurs in the feeding direction.

Incidentally, in the constitution of this embodiment, the improper cleaning is liable to occur in about 2 mm of the leading end portion of the toner band. There is a possibility that this range changes depending on a setting condition (such as contact pressure) of the blade 82, a toner amount of the toner band, flowability (kind) of the toner, and the like. However, it is understood that there is a tendency that the improper cleaning is liable to occur in a predetermined range of the leading end portion of the toner band than on a side closer to the trailing end than the predetermined range is.

8. Toner Band in this Embodiment

Next, the toner band (lubricating toner band, discharge toner band) in this embodiment will be described. In this embodiment, in order to suppress the above-described improper cleaning of the toner band (lubricating toner band, discharge toner band), the forming operation of the toner band (lubricating toner band, discharge toner band) is controlled, specifically, the part of the toner band (lubricating toner band, discharge toner band) is controlled.

First, with reference to FIG. 9, the lubricating toner band will be described. Part (a) of FIG. 9 is a schematic view for illustrating a part of a lubricating toner band in a comparison example 1. Incidentally, the lubricating toner band in the comparison example 1 is an example of a conventional lubricating toner band. The lubricating toner band in the comparison example 1 is pressed by repetitively forming a lateral 4Line-1Space ("lateral 4L1S") part (solid line frame portion in part (a) of FIG. 9) which is a minimum unit pattern over 2 mm in the feeding direction within a longitudinal whole area (range of 305 mm in the longitudinal direction). As described above, the lateral 4Line-1Space part is the pattern comprising the print portion of the 4 dots in the feeding direction and the non-print portion of the 1 dot adjacent to the print portion in the feeding direction. In order to form the lubricating toner band in the comparison example 1, in the case where the process speed is 200 mm/sec, it takes 0.01 sec. Further, as regards the lubricating toner band in the comparison example 1, by a mechanism described with reference to FIGS. 7 and 8, improper cleaning of the lubricating toner band occurs. In this embodiment, the improper cleaning of the toner band was evaluated in the following manner. The toner band forming operation is performed, and the secondary transfer step is performed by passing the recording material S through the secondary transfer portion T2 so as to overlap with the toner band after one-full circumference (turn) of the intermediary transfer belt 7. Then, the recording material S is passed through the fixing device 10, and then is outputted from the image forming apparatus 100. Then, the presence or absence of the toner band on the recording material S is checked by eye observation. In the case where the toner band is present, discrimination that the improper cleaning of the toner band occurred is made, and in the case where the toner band is absent, discrimination that the improper cleaning of the toner band did not occur is made. Further, a toner density of a portion corresponding to the toner band on the recording material S (herein, this toner density is also referred to as a "pass-through toner density") was measured using a reflection densitometer. This is true for other embodiments described later.

On the other hand, part (b) of FIG. 9 is a schematic view for illustrating a part of a lubricating toner band in this embodiment (embodiment 1). In the lubricating toner band in this embodiment, a minimum unit pattern (solid line frame portion in part (b) of FIG. 9) was a part of a lateral 1Line-8Space ("lateral 1L8S"). That is, the lubricating toner band in this embodiment is pressed by repetitively forming the lateral 1Line-8Space part which is a minimum unit pattern over 14 mm in the feeding direction within a longitudinal whole area (range of 305 mm in the longitudinal direction). Incidentally, the lateral 1Line-8Space part is the pattern comprising the print portion of 1 dot in the feeding direction and the non-print portion of 8 dots adjacent to the print portion in the feeding direction. In order to form the lubricating toner band in this embodiment, in the case where the process speed is 200 mm/sec, it takes 0.07 sec. As regards the lubricating toner band in this embodiment, a toner supply amount per unit time of the toner to the edge portion 82*a* of the blade 82 becomes smaller than the toner supply amount of the lubricating toner band in the comparison example 1. By this, the force for pushing up the blade 82 by the lubricating toner band becomes smaller than the force for pressing the free end of the blade 82 against the intermediary transfer belt 7, so that the improper cleaning of the lubricating toner band can be suppressed. However, in the lubricating toner band in this embodiment, in order to supply the toner to the edge portion 82*a* of the blade 82 in the same amount as the amount of the toner of the lubricating toner band in the comparison example 1, there is a need to form the lateral 1Line-8Space pattern over 14 mm in the feeding direction.

Here, when the lubricating toner band in this embodiment is viewed per unit area of 1 mm (feeding direction)×1 mm (longitudinal direction), the following relationship is satisfied. That is, the lubricating toner band in this embodiment is prepared by repetitively forming the lateral 1Line-8Space pattern which is the minimum unit pattern over 14 mm in the feeding direction within the longitudinal whole area (range of 305 mm in the longitudinal direction). In this case, when this pattern is viewed, for example, per unit area of 1 mm (feeding direction)×1 mm (longitudinal direction), the lateral 1 Line portion (broken line frame portion in part (b) of FIG. 9) which is a printed portion (maximum density portion) has a length in a direction along the feeding direction (vertical length W1) and a length in a direction along the longitudinal direction (lateral length W2), which satisfy a relationship therebetween (value/lateral ratio) of (vertical length W1)<(lateral length W2).

A table 1 below is a summary of the minimum unit pattern, the length in the feeding direction, the occurrence or non-occurrence of the improper cleaning and the slip (pass)-though toner density, and productivity (toner band forming operation time) for the above-described lubricating toner bands in the comparison example 1 and this embodiment (embodiment 1).

TABLE 1

| | MUP*[1] | FDL*[2] | IC/STTD*[3] | PROD*[4] |
|---|---|---|---|---|
| COMP. EX. 1 | (L)4L1S | 2 mm | (O)/0.019 | 0.01 sec |
| EMB. 1 | (L)1L8S | 14 mm | (NO)/0.000 | 0.07 sec |

*[1]"MUP" is the minimum unit pattern. (L) is lateral.
*[2]"FDL" is the feeding direction length (mm).
*[3]"IC/STTD" is improper cleaning/slip-through toner density. (O) represents that the improper cleaning occurred, and (NO) represents that the improper cleaning did not occur.
*[4]"PROD" is the productivity, i.e., the toner band forming operation time (sec).

Next, with reference to FIG. 10, the discharge toner band will be described. Part (a) of FIG. 10 is a schematic view for illustrating a direction pattern in a comparison example 2. Incidentally, the discharge toner band in the comparison example 2 is an example of a conventional discharge toner band. Further, a minimum unit pattern of the discharge toner band in the comparison example 2 is the same as the minimum unit pattern of the above-described lubricating toner band in the comparison example 1. That is, the discharge toner band in the comparison example 2 is prepared by repetitively forming a lateral 4Line-1Space ("lateral 4L1S") pattern (solid line frame portion in part (a) of FIG. 10) which is the minimum unit pattern over 210 mm in the feeding direction within the longitudinal whole area (range of 305 mm in the longitudinal direction). In order to form the discharge toner band in the comparison example 2, in the case where the process speed is 200 mm/sec, it takes 1.05 sec. Further, as regards the discharge toner band in the comparison example 2, by the mechanism described with reference to FIGS. 7 and 8, the improper cleaning of the discharge toner band occurs. Further, the discharge toner band in the comparison example 2 needs a length of 210 mm in the feeding direction in order to discharge the deterioration toner in the developing device 4 in a necessary amount. For that reason, in order to form the discharge toner band in the comparison example 2, in the case where the process speed is 200 mm/sec, 1.05 see is needed.

Next, part (b) of FIG. 10 is a schematic view for illustrating a direction pattern in a comparison example 3. Incidentally, when compared with the comparison example 2, the comparison example 3 is an example in which a minimum unit pattern which is the same as the minimum unit pattern of the above-described lubricating toner band in this embodiment in order to suppress the improper cleaning. As regards the discharge toner band in the comparison example 3, the minimum unit pattern (solid line frame portion in part (b) of FIG. 10) was a lateral 1Line-8Space ("lateral 1L8S") pattern. That is, the discharge toner band in the comparison example 3 is prepared by repetitively forming the lateral 1Line-8Space pattern which is the minimum unit pattern over 1470 mm in the feeding direction within the longitudinal whole area (range of 305 mm in the longitudinal direction). In order to form the discharge toner band in the comparison example 3, in the case where the process speed is 200 mm/sec, it takes 7.35 sec. As regards the discharge toner band in the comparison example 3, the toner supply amount per unit time of the toner to the edge portion 82*a* of the blade 82 becomes smaller than the toner supply amount of the discharge toner band in the comparison example 2. By this, the force for pushing up the blade 82 by the discharge toner band becomes smaller than the force for pressing the free end of the blade 82 against the intermediary transfer belt 7, so that the improper cleaning of the discharge toner band can be suppressed. However, the discharge toner band in the comparison example 3 needs a length of 1470 mm in the feeding direction (which is 7 times the length in the comparison example 2) in order to discharge the deterioration toner in the developing device 4 in a necessary amount. For that reason, in order to form the discharge toner band in the comparison example 3, in the case where the process speed is 200 mm/sec, 7.35 sec is needed. That is, compared with 1.05 sec in the comparison example 2, the time is increased by 6.30 sec, and therefore, for example, in the case where a low-print ratio image with a low print ratio is continuously formed, there is a possibility that the productivity lowers.

On the other hand, part (c) of FIG. 10 is a schematic view for illustrating a direction pattern in this embodiment (embodiment 1). In the discharge toner band in this embodiment, a minimum unit pattern (solid line frame portion in part (c) of FIG. 10) was a vertical 2Line-5Space ("vertical 2L5S") pattern. That is, the discharge toner band in this embodiment is prepared by repetitively forming the vertical 2Line-5Space pattern which is the minimum unit pattern over 420 mm in the feeding direction within the longitudinal whole area (range of 305 mm in the longitudinal direction). Incidentally, the vertical 2Line-5Space pattern is a pattern comprising a print portion of 2 dots in the longitudinal direction and a non-print portion of 5 dots adjacent to the print portion in the longitudinal direction. In order to form the discharge toner band in this embodiment in the case where the process speed is 200 mm/sec, it takes 2.10 sec. As regards the discharge toner band in this embodiment, the supply toner amount of the toner to the edge portion 82*a* of the blade 82 becomes smaller than the supply toner amount of the toner of the discharge toner band in the comparison example 2. By this, the force for pushing up the blade 82 by the discharge toner band becomes smaller than the force for pressing the free end of the blade 82 against the intermediary transfer belt 7, so that the improper cleaning of the discharge toner band can be suppressed. Further, the discharge toner band in this embodiment needs a length of 420 mm in the feeding direction (which is twice the length in the comparison example 2) in order to discharge the deterioration toner in the developing device 4 in a necessary amount. For that reason, in order to form the discharge toner band in this embodiment, in the case where the process speed is 200 mm/sec, 2.10 sec is needed. However, compared with 7.35 sec in the comparison example 3, the time is shortened by 5.25 sec. Thus, according to the discharge toner band in this embodiment, it is possible to suppress the improper cleaning of the discharge toner band while suppressing a lowering in productivity.

Here, when the discharge toner band in this embodiment is viewed per unit area of 1 mm (feeding direction)×1 mm (longitudinal direction), the following relationship is satisfied. That is, the discharge toner band in this embodiment is prepared by repetitively forming the vertical 2Line-5Space pattern which is the minimum unit pattern over 420 mm in the feeding direction within the longitudinal whole area (range of 305 mm in the longitudinal direction). In this case, when this pattern is viewed, for example, per unit area of 1 mm (feeding direction)×1 mm (longitudinal direction), the voltage 2Line portion (broken line frame portion in part (c) of FIG. 10) which is a printed portion (maximum density portion) has a length in a direction along the feeding direction (vertical length W1) and a length in a direction along the longitudinal direction (lateral length W2), which satisfy a relationship therebetween (value/lateral ratio) of (vertical length W1)>(lateral length W2).

That is, in this embodiment, the vertical/lateral ratio of the lateral 1Line portion which is the print portion in the case where the lubricating toner band is viewed per unit area of 1 mm (feeding direction)×1 mm (longitudinal direction) (i.e., (vertical length W1)<(lateral length W2)) and the vertical/lateral ratio of the value 2 Line portion which is the print portion in the case where the discharge toner band is viewed per unit area of 1 mm (feeding direction)×1 mm (longitudinal direction) (i.e., (vertical length W1)>(lateral length W2)) are different from each other.

A table 2 below is a summary of the minimum unit pattern, the length in the feeding direction, the occurrence or non-occurrence of the improper cleaning and the slip (pass)-though toner density, and productivity (toner band forming operation time) for the above-described discharge toner bands in the comparison examples 2 and 3, and this embodiment (embodiment 1).

TABLE 2

| | MUP*[1] | FDL*[2] | IC/STTD*[3] | PROD*[4] |
|---|---|---|---|---|
| COMP. EX. 2 | (L)4L1S | 210 mm | (O)/0.017 | 0.05 sec |
| COMP. EX. 2 | (L)1L8S | 1470 mm | (NO)/0.000 | 7.35 sec |
| EMB. 1 | (V)2L5S | 420 mm | (NO)/0.000 | 2.10 sec |

*[1]"MUP" is the minimum unit pattern. (L) is lateral, and (V) is vertical.
*[2]"FDL" is the feeding direction length (mm).
*[3]"IC/STTD" is improper cleaning/slip-through toner density. (O) represents that the improper cleaning occurred, and (NO) represents that the improper cleaning did not occur.
*[4]"PROD" is the productivity, i.e., the toner band forming operation time (sec).

Here, the reason why the lubricating toner band pattern and the discharge toner band pattern are made different from each other will be described.

First, the reason why the pattern of the discharge toner band can be made the vertical Line pattern will be described. The toner of the lubricating toner band is toner which is small in degree of liberation of the external additive in the developing device 4 and which is high in ability to form the external additive blocking layer on a side upstream of the blade nip Q. In other words, the lubricating toner band also has a function of forming the external additive blocking layer for suppressing the slip-through of the transfer residual toner through the blade 82 on the side upstream of the blade nip Q. For that reason, when the pattern of the lubricating toner band is made the vertical Line pattern, there arises a difference in width of the external additive blocking layer between the vertical Line portion (print portion extending in a direction along the feeding direction) and the vertical Space portion (non-print portion extending in a direction along the feeding direction). Thus, when a place where the width of the external additive blocking layer is narrow is formed, in the place, the transfer residual toner during the normal image formation is liable to slip (pass) through the blade 82. On the other hand, the discharge toner band is used for discharging the deterioration toner in the developing device 4, and therefore, the discharge toner band principally comprises the deterioration toner. As regards the discharge toner band, the external additive thereof is liberated therefrom, so that the discharge toner band is toner originally low in ability to form the external additive blocking layer. For that reason, the difference in width of the external additive blocking layer is hardly generated between the vertical Line portion (the print portion extending in the direction along the feeding direction) and the vertical Space portion (the non-print portion extending in the direction along the feeding direction). For this reason, a band pattern of the discharge toner band can be made the vertical Line pattern. Thus, as regards the discharge toner band, there is a degree of freedom such that the non-print portion extending in the direction along the feeding direction is provided.

Next, the reason why the improper cleaning of the discharge toner band can be suppressed even when the discharge toner band pattern is made the vertical Line pattern. FIG. 11 is a graph showing a measurement result of a toner charge amount of the lubricating toner band on the intermediary transfer belt 7 and a toner charge amount of the discharge toner band on the intermediary transfer belt 7. The toner charge amount was calculated by measuring an electric charge per unit weight (mass) by a general suction method in this field. This method measures a charge amount [μC/g] by measuring a weight [g] and an electric charge amount [μC] of the sucked toner, so that an average charge amount of the toner can be grasped. As shown in FIG. 11, the toner of the discharge toner band is principally the deterioration toner, and therefore, the charge amount of the toner of the discharge toner band is small, so that an electrostatic attraction force of the toner of the discharge toner band to the intermediary transfer belt 7 is small. For that reason, the toner of the discharge toner band is easy to be removed and thus is advantageous with respect to suppression of the improper cleaning. For that reason, the improper cleaning can be suppressed even when the minimum unit pattern is changed from the lateral 1 Line-8Space pattern in the comparison example 3 to the vertical 2Line-5Space pattern in this embodiment.

Incidentally, the minimum unit pattern of the lubricating toner band is not limited to the pattern in this embodiment. Depending on the setting condition (contact pressure or the like) of the blade 82, the amount of the toner of the lubricating toner band, the flowability (kind) of the toner, and the like, at least one of the dot number of the print portion of the minimum unit pattern and the dot number of the non-print portion adjacent to the print portion of the minimum unit pattern may be changed. In this embodiment, in the feeding direction, the minimum unit pattern constituted by a minimum unit dot of the lubricating toner band was 1 dot (1 Line) in terms of the dot number (minimum dot number) of the print portion, and was 8 dots (8 Space) in terms of the dot number of the non-print portion adjacent to the print portion. As regards the minimum unit pattern of the lubricating toner band, in the feeding direction, the dot number of the print portion may preferably be 3.5 or less (60% or less) of the dot number of the non-print portion adjacent to the print portion, more preferably be ½ or less (50% or less) of the dot number of the non-print portion. By this, depending on the above-described various conditions, it is possible to expect a corresponding improper cleaning suppressing effect. However, in order to further enhance the improper cleaning suppressing effect, as regards the minimum unit pattern of the lubricating toner band, in the feeding direction, the dot number of the print portion may preferably be smaller than ½ (smaller than 50%), more preferably be 2.5 or less (40% or less), further preferably be 1/3.3 or less (30% or less), and most preferably be ⅛ or less (12.5% or less), of the dot number of the non-print portion adjacent to the print portion.

However, in order to suppress the lowering in productivity, as regards the minimum unit pattern of the lubricating toner band, in the feeding direction, the dot number of the print portion may preferably be 1/20 or more (5% or more), more preferably be 1/10 or more (10% or more) of the dot number of the non-print portion adjacent to the print portion. Further, in order to suppress the improper cleaning, in the minimum unit pattern of the lubricating toner band, the dot number of the print portion continuous in the feeding direction may preferably be 4 dots or less, more preferably be 2 dots or less, most preferably be 1 dot. When relationships in the above-described ranges between the dot number of the print portion and the dot number of the non-print portion are satisfied, the print portion and the non-print portion may be equidistantly disposed or may be not equidistantly disposed.

Further, the minimum unit pattern of the discharge toner band is not limited to the pattern in this embodiment. Depending on the setting condition (contact pressure or the like) of the blade 82, the amount of the toner of the discharge toner band, the flowability (kind) of the toner, and the like, at least one of the dot number of the print portion of the minimum unit pattern and the dot number of the non-print portion adjacent to the print portion of the minimum unit pattern may be changed. In this embodiment, in the longitudinal direction, the minimum unit pattern constituted by a minimum unit dot of the discharge toner band was 2 dot (2 Line) in terms of the dot number (minimum dot number) of the print portion, and was 5 dots (5 Space) in terms of the dot number of the non-print portion adjacent to the print portion. As regards the minimum unit pattern of the discharge toner band, in the longitudinal direction, the dot number of the print portion may preferably be 3.5 or less (60% or less) of the dot number of the non-print portion adjacent to the print portion, more preferably be ½ or less (50% or less) of the dot number of the non-print portion. By this, depending on the above-described various conditions, it is possible to expect a corresponding improper cleaning suppressing effect. However, in order to further enhance the improper cleaning suppressing effect, as regards the minimum unit pattern of the discharge toner band, in the longitudinal direction, the dot number of the print portion may preferably be smaller than ½ (smaller than 50%), more preferably be 2.5 or less (40% or less), of the dot number of the non-print portion adjacent to the print portion.

However, in order to suppress the lowering in productivity, as regards the minimum unit pattern of the discharge toner band, in the longitudinal direction, the dot number of the print portion may preferably be 1/10 or more (10% or more), more preferably be ⅕ or more (20% or more) of the dot number of the non-print portion adjacent to the print portion. Further, in order to suppress the productivity, in the minimum unit pattern of the discharge toner band, the dot number of the print portion continuous in the longitudinal direction may preferably be 2 dots or more. On the other hand, in order to suppress the improper cleaning, in the minimum unit pattern of the discharge toner band, the dot number of the print portion continuous in the longitudinal direction may preferably be 4 dots or less, more preferably be 3 dots or less, most preferably be 2 dots. When relationships in the above-described ranges between the dot number of the print portion and the dot number of the non-print portion are satisfied, the print portion and the non-print portion may be equidistantly disposed or may be not equidistantly disposed.

Further, as described above, the discharge toner band is pushed into the toner stagnation layer as shown in FIG. 7, and therefore, a force for most pushing up the blade 82 by the leading end portion of the discharge toner band in the feeding direction becomes large. By this, the toner of the toner stagnation and the toner of the discharge toner band at the leading end portion in the feeding direction slip through the blade 82, so that the improper cleaning in about 2 mm in the feeding direction occurs. For that reason, the discharge toner band may only be required to be formed in a predetermined pattern according to this embodiment as described above, particularly in a range from a leading end to a position of 2 mm from the leading end toward a trailing end side in the feeding direction. That is, the discharge toner band may only be required to be formed in a pattern such that a relationship (vertical/lateral ratio) between a length (vertical length W1) in a direction along the feeding direction and a length (lateral length W2) in a direction along the longitudinal direction, of a printed portion as viewed per unit area of 1 mm (feeding direction)×1 mm (longitudinal direction), for example, becomes (lateral length W1)>(length W2). At this time, the discharge toner band may desirably only be required to be formed in a pattern satisfying the above-described relationships between the dot number of the print portion and the dot number of the non-print portion in the range of 2 mm (from the leading end to the position of 2 mm from the leading end toward the trailing end side in the feeding direction). That is, in this embodiment, in the range of 2 mm, the print portion of the discharge toner band comprises a plurality of line-shaped transfers formed continuously over a whole area in the feeding direction. Incidentally, in this embodiment, the print portion of the discharge toner band is formed continuously over the whole area in the feeding direction, but the present invention is not limited thereto. If the print portion of the discharge toner band can be regarded as being formed substantially continuously over the substantially whole area in the feeding direction, a constitution in which a part of the print portion is thinned out in the feeding direction may be employed. Incidentally, in the present invention, the formation of the print portion substantially continuous over the substantially whole area in the feeding direction refers to that a ratio of occupancy of a print region is 90% or more when a place where the print portion is disposed is viewed along the whole area in the feeding direction.

Further, for the above-described reason, the improper cleaning of the discharge toner band does not readily occur on a side closer to the trailing end than the range of 2 mm (from the leading end to the position of 2 mm from the leading end toward the trailing end side in the feeding direction) is. For that reason, on the trailing end side than the range of 2 mm, the discharge toner band may be formed in any pattern. However, in order to minimize an increase in time required to perform the discharge toner band forming operation, the discharge toner band may preferably be formed in a pattern such that on the trailing end side than the range of 2 mm from the leading end, a toner amount per unit area (for example, 1 mm (feeding direction)×1 mm (longitudinal direction)) is larger than the toner amount per unit area in the range of 2 mm from the leading end. Typically, as shown in part (a) of FIG. 12, the discharge toner band may preferably be printed with all the dots in the feeding direction and the longitudinal direction (i.e., formed in a solid image) on the trailing end side than the range of 2 mm from the leading end. Incidentally, as described above, in the constitution of this embodiment, although the improper cleaning is liable to occur in the range of about 2 mm at a leading end portion of the toner band, but there is a possibility that this range changes. For that reason, the toner band pattern can be changed as described above between a predetermined range at the leading end portion of the toner band in which the improper cleaning is liable to occur and the trailing end portion than the predetermined range.

In general, compared with the discharge toner band, the lubricating toner band is only required to have a short length in the feeding direction, so that necessity in change of the pattern of the lubricating toner band between the leading end side and the trailing end side in the feeding direction is low. However, even for the lubricating toner band, in the case where the length thereof in the feeding direction is longer than 2 mm, the lubricating toner band pattern may be changed between the leading end side and the trailing end side in the feeding direction in order to further shorten the time required to perform the lubricating toner band forming operation. In this case, particularly in the above-described range of 2 mm from the leading end, the lubricating toner band may only be required to be formed in the predetermined pattern according to this embodiment as described above. That is, for example, the lubricating toner band may only be required so that the relationship (vertical/lateral ratio) between the length (vertical length W1) in the direction along the feeding direction and the length (lateral length W2) in the direction along the longitudinal direction, of the printed portion as viewed per unit area, for example, 1 mm (feeding direction)×1 mm (longitudinal direction). At this time, the lubricating toner band may desirably only be required to be formed in a pattern satisfying the above-described relationships between the dot number of the print portion and the dot number of the non-print portion in the above-described range of 2 mm from the leading end.

Further, in this embodiment, the discharge toner band is formed in the pattern extending substantially parallel to the feeding direction at the printed portion as viewed per unit area of, for example, 1 mm (feeding direction)×1 mm (longitudinal direction), but the present invention is not limited thereto. The printed potion of the discharge toner band may be formed in a pattern extending in a range of ±30° in angle relative to the feeding direction (part (b) of FIG. 12). The case where such an angle is formed is also included in the case where the printed portion extends in the direction along the feeding direction. However, in order to suppress the lowering in productivity, the printed portion of the discharge toner band may preferably be formed in a pattern in which an angle formed between the printed portion and the feeding direction is small as can as possible (i.e., the printed portion extends near parallel to the feeding direction). Here, the case where the direction in which the printed portion of the discharge toner band extends is inclined relative to the feeding direction will be considered. When the direction in which the printed portion of the discharge toner band extends becomes gentle relative to the feeding direction, the state of the discharge toner band approaches the state of the discharge toner band in the comparison example 3. Then, the state of the discharge toner band approaches a state in which the discharge toner band is supplied to the longitudinal whole area substantially at the same time. For this reason, there is an increasing risk such that the discharge toner band pushes up the cleaning blade and thus the toner slips through the cleaning blade, so that in order to avoid such a risk, there is a need to increase an interval between adjacent print portions. In such a case, the productivity is lowered as in the comparison example 3. For this reason, the discharge toner band may preferably be formed in a pattern in which the printed portion thereof extends with an angle in a range of ±30°, more preferably ±10°, relative to the feeding direction.

Further, the printed portion of the discharge toner band in this embodiment is formed in a thin pattern extending in the feeding direction, but a pattern in which square patterns equal in width in the feeding direction and the longitudinal direction are arranged staggered will be considered. In this case, the resultant pattern is close to a pattern such that the printed portion extends with an angle of ±45° relative to the feeding direction, and thus is not preferred as described above. Further, patterns in a positive direction and disposed separated from each other in the feeding direction, and therefore, are not preferred also from the viewpoint of the productivity.

Similarly, the lubricating toner band is formed in the pattern extending substantially parallel to the longitudinal direction at the printed portion as viewed per unit area of, for example, 1 mm (feeding direction)×1 mm (longitudinal direction), but the present invention is not limited thereto. The printed potion of the discharge toner band may be formed in a pattern extending in a range of ±30° in angle relative to the longitudinal direction (part (c) of FIG. 12). However, from the viewpoint of uniformizing a distribution of the external additive blocking layer, the lubricating toner band may preferably be formed in a pattern such that the printed portion thereof has an angle as small as possible formed between itself and the longitudinal direction (i.e., is close to parallel to the longitudinal direction). The case where such an angle is formed is also included in the case where the printed portion extends in the direction along the feeding direction. Incidentally, the term "substantially parallel to" includes that the printed portion has an angle of a degree of an error range (for example, ±10°).

Further, in this embodiment, each of the lubricating toner band and the discharge toner band is formed in the longitudinal whole area, but is not limited thereto. However, the lubricating toner band may desirably have a sufficient length in the longitudinal direction so that a lubricating property can be imparted to the blade 82 in a substantially whole area in the longitudinal direction.

Further, the discharge toner band may desirably have a sufficient length in the longitudinal direction so that a time required to perform the discharge toner band forming operation can be made as short as possible. Each of the lengths of the lubricating toner band and the discharge toner band in the longitudinal direction is desired to be 50% or more, preferably be 80% or more, further preferably be 90% or more, and typically about 100%, of the length of the image forming region.

Further, in this embodiment, the cleaning device using a swing blade which is swingably supported and which is pressed against a member-to-be-cleaned by the pressing spring was described as an example. According to such a constitution, there is an advantage such that a pressing force of the cleaning blade to the member-to-be-cleaned can be stabilized, but the present invention is not limited to application to the cleaning device having such a constitution. As the cleaning device, there is a cleaning device using a fixed blade which is fixedly provided. In the cleaning device using the fixed blade, a contact pressure of the cleaning blade to the member-to-be-cleaned is set depending on a material, a fixing position, and the like of the cleaning blade. Also, in the cleaning provided using the fixed blade, there is a possibility of occurrence of the improper cleaning of the toner band (lubricating toner band, discharge toner band) due to the setting condition (contact pressure or the like) of the cleaning blade, the amount of the toner of the toner band, the flowability of the toner (the kind of the toner), and the like. For that reason, the present invention is also effective for the cleaning device using the fixed blade.

Further, in this embodiment, the cleaning device 8 was described, but the present invention is also effective in the case where the toner band is supplied to the edge portion of the cleaning blade of the drum cleaning device 6. That is, in order to suppress occurrences of noise (unusual sound) and turning-up of the cleaning blade due to poor slip between the cleaning blade of the drum cleaning device 6 and the photosensitive drum 1, an operation in which the lubricating toner band is formed and supplied to the edge portion of the cleaning blade is executed in some instances.

Further, the discharge toner band is conveyed to the drum cleaning device 6 without being primary-transferred onto the intermediary transfer belt 7 in some instances. Also, in this case, the pattern of the toner band (lubricating toner band, discharge toner band) is made the pattern according to this embodiment, so that an effect similar to the effect of this embodiment can be obtained.

Thus, in this embodiment, the image forming apparatus 100 includes the rotatable image bearing member (intermediary transfer belt 7) for bearing the toner image, the developing device 4 for developing the electrostatic image with the toner, the image forming means (image forming portion) P for forming the toner image on the image bearing member 7, the transfer means (secondary transfer roller) 9 for transferring the toner image, formed on the intermediary transfer belt 7, onto the recording material S, the cleaning blade 82 which contacts the image bearing member 7 along the second direction (longitudinal direction) substantially perpendicular to the first direction (feeding direction) being the surface movement direction of the image bearing member 7 and which is for removing the toner from the image bearing member 7, and the controller 200 for carrying out the control so as to execute the predetermined operation (discharge toner band forming operation) in which the predetermined toner image (discharge toner band) which is not to be transferred onto the recording material S is formed on the basis of the index value correlating with the print ratio of the toner image formed on the image bearing member 7 and then in which the predetermined toner image is removed from the image bearing member 7 by the cleaning blade 82. The predetermined toner image is prepared by repetitively forming the print portion extending along the first direction and the non-print portion extending adjacent to the print portion in the first direction as viewed per unit area of 1 mm (first direction)×1 mm (second direction) within at least the predetermined range of the leading end portion thereof in the first direction. In this embodiment, in at least the predetermined range, when the predetermined toner image is viewed per unit area described above, the relationship between the length W1 of the print portion in the direction along the first direction and the length W2 of the print portion in the direction along the second direction satisfy W1>W2. Further, in this embodiment, in at least the above-described predetermined range, when the predetermined toner image is viewed per unit area described above, the predetermined toner image is formed so that the print portion is substantially parallel to the above-described first direction. Further, in this embodiment, in at least the above-described predetermined range, the predetermined toner image is prepared by repetitively forming the minimum unit pattern in the above-described first direction and the above-described second direction. In the minimum unit pattern, in the second direction, typically, the dot number of the print portion is smaller than ½ of the dot number of the non-print portion adjacent to the print portion, and preferably, the dot number of the print portion is ⅖ or less of the dot number of the non-print portion adjacent to the print portion. In this embodiment, the dot number of the print portion is 2 dots, and the dot number of the non-print portion adjacent to the print portion is 5 dots. Further, the above-described predetermined toner image may be formed so as to include the first region in the above-described predetermined range and the second region on the trailing end side than the predetermined range in the first direction. In this case, the toner amount per unit area described above in the second region can be made larger than the toner amount per unit area described above in the first region. Typically, the second region is formed by the solid image. Further, in this embodiment, the above-described predetermined range is the range from the leading end of the above-described predetermined toner image to the position of 2 mm from the leading end toward the trailing end side of the predetermined image in the first direction. Further, in this embodiment, the predetermined toner image is formed over the substantially whole area of the image forming region in the above-described second direction.

Further, in this embodiment, the controller 200 is capable of carrying out control so as to execute the first operation (discharge toner band forming operation) for forming the predetermined first toner image (discharge toner band) which is not to be transferred onto the recording material and the second operation (lubricating toner band forming operation) for forming the predetermined second toner image (lubricating toner band) which is not to be transferred onto the recording material S. Then, in at least the above-described predetermined range, when the first toner image is viewed per unit area described above, the first toner image is prepared by repetitively forming the print portion extending along the above-described first direction and the non-print portion, adjacent to the print portion, extending in the first direction. In at least the predetermined range, when the second toner image is viewed per unit area described above, the second toner image is prepared by repetitively forming the print portion extending along the above-described second direction and the non-print portion, adjacent to the print portion, extending along the second direction. In this embodiment, in at least the above-described predetermined range, when the first toner image is viewed per unit area described above, the relationship between the length W1 of the print portion in the direction along the first direction and the length W2 of the print portion in the direction along the second direction satisfy W1>W2. In at least the predetermined range, when the second toner image is viewed per unit area described above, the relationship between the length W1 of the print portion in the direction along the first direction and the length W2 of the print portion in the direction along the second direction satisfy W1<W2. Further, in this embodiment, the first toner image is formed so as to include the first region in the above-described predetermined range and the second region on the trailing end side than the predetermined range in the first direction, and the second toner image is formed so that entirety thereof from the leading end to the trailing end in the first direction is included within the predetermined range.

As described above, according to this embodiment, the improper cleaning of the discharge toner band can be suppressed while suppressing the lowering in productivity. Further, according to this embodiment, depending on the kind of the toner band (lubricating toner band, discharge toner band), the pattern of the toner band, specifically, the vertical/lateral ratio of the toner band pattern is changed. By this, not only the improper cleaning of the toner band can be suppressed depending on the kind of the toner band, but also the lowering in productivity due to a time required to perform the toner band forming operation can be suppressed to a minimum level depending on the kind of the toner band.

Embodiment 2

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

In this embodiment, the pattern of the discharge toner band is changed depending on a degree of deterioration of the toner in the developing device 4. That is, in the case where the low-print ratio image with the low print ratio is continuously formed and a frequency of execution of the discharge toner band forming operation is high, a lowering in toner charge amount due to the toner deterioration progresses, and cleaning of the toner of the discharge toner band is easily performed, so that it becomes advantageous to suppress the improper cleaning. In such a case, even when the number of vertical Lines in a portion which is the print portion of the discharge toner band is increased, it is possible to suppress that the toner of the discharge toner band slips through the blade 82.

Therefore, in this embodiment, the pattern of the discharge toner band is changed on the basis of information of an execution history of the discharge toner band forming operation, so that the time required to perform the discharge toner band forming operation can be further shortened. As regards the discharge toner band pattern, for example, at least one of the dot number of the print portion and the dot number of the non-print portion in the minimum unit pattern can be changed.

FIG. 13 is a schematic block diagram showing a control mode of the image forming apparatus 100 of this embodiment. The control mode in this embodiment shown in FIG. 13 is approximately similar to the control mode in the embodiment 1 shown in FIG. 4. However, in this embodiment, the controller 200 is provided with an execution history recording (storing) portion 203 for recording (storing) the information of the execution history of the discharge toner band. In this embodiment, the execution history recording portion 203 records (stores) information on a discrimination result of execution or non-execution of the discharge toner band forming operation described with reference to FIG. 5 for each execution of control of discriminating the execution or non-execution of the above-described discharge toner band forming operation, information on the number of executions of the discharge toner band forming operation in a predetermined period, and the like information. This predetermined period may be, for example, a period corresponding to a predetermined number of times of control of discrimination of execution or non-execution of the discharge toner band forming operation until the present control, a period from an initial stage of use of the developing device 4 to the present control, or the like period. In this embodiment, the execution history recording portion 203 is realized by the CPU and the non-volatile memory.

FIG. 14 is a flowchart of control of the discharge toner band pattern in this embodiment. Incidentally, in this embodiment, description will be made by paying attention to one image forming portion P as a representative, but similar control is carried out for each of the image forming portions. Further, in this embodiment, for simplification, description of the control of the discrimination of the execution or non-execution of the discharge toner band forming operation described with reference to FIG. 5 is omitted, and description will be made by paying attention to selection of the pattern when the discharge toner band forming operation is executed.

When the controller 200 receives a job and thereafter executes the discharge toner band forming operation (S301), the controller 200 acquires the information on the execution history of the discharge toner band forming operation from the execution history recording portion 203 (S302). Then, on the basis of the information on the execution history of the discharge toner band forming operation, the controller 200 discriminates whether or not the discharge toner band forming operations in the number of times which is a predetermined threshold or more were continuously executed until the present control (S303). Here, continuous execution of the discharge toner band forming operations refers to that in control of discriminating execution or non-execution of continuous discharge toner band forming operations, discrimination that each of the discharge toner band forming operations is needed is made and thus the discharge toner band forming operations are executed. Then, in the case where the controller 200 discriminated in S303 that the discharge toner band forming operations in the number of times which is the predetermined threshold or more is continuously executed, the controller 200 increases the vertical Line number of the discharge toner band from, for example, vertical 2lines to vertical 3Lines (i.e., vertical 3Line-5Space), and correspondingly to an increased vertical Line number, the discharge toner band is formed by shortening the length of the discharge toner band in the feeding direction (S304).

Further, in the case where the controller 200 discriminated in S303 that the discharge toner band forming operations in the number of times which is the predetermined threshold or more is not continuously executed, on the basis of the information on the execution history of the discharge toner band forming operation, the controller 200 discriminates whether or not the number of times of execution of the discharge toner band forming operations in a predetermined period until the present control although these operations are not continuous in a predetermined threshold or more (S305). Then, in the case where the controller 200 discriminated in S305 that the discharge toner band forming operations in the number of times which is the predetermined threshold or more is continuously executed, the controller 200 decreases the vertical Space number of the discharge toner band from, for example, vertical 5Spaces to vertical 4Spaces (i.e., vertical 2Line-4Space), and correspondingly to a decreased vertical Space number, the discharge toner band is formed by shortening the length of the discharge toner band in the feeding direction (S306).

Further, in the case where the controller discriminated in S305 that the discharge toner band forming operations in the number of times which is the predetermined threshold or more are not executed, the discharge toner band is formed with the vertical Line number, the vertical Space number, and the feeding direction length (for example, vertical 2Line-5Space, feeding direction length: 420 mm) of the normal discharge toner band (S307).

Incidentally, in this embodiment, in each of S304, S306, and S307, the discharge toner band pattern was changed. The discharge toner band (vertical 3Line-5Space) formed in S304, the discharge toner band (vertical 2Line-4Space) formed in S306, and the discharge toner band (vertical 2Line-5Space) formed in S307 become long in length in a named order. However, the present invention is not limited to such a mode, but for example, the discharge toner band pattern may be changed only depending on whether or not the discharge toner band forming operations are continuously executed a predetermined number of times or more. Thus, depending on an index value indicating the deterioration degree of the toner in the developing device 4, it is possible to change a ratio (D1/D2) of a dot number D1 of the print portion in the longitudinal direction to a dot number D2 of the non-print portion adjacent to the print portion, in the minimum unit pattern of the discharge toner band. As the index value indicating the deterioration degree of the developing device 4, it is possible to use the information on the execution frequency of the discharge toner band forming operation. As the information on the execution frequency of the discharge toner band forming operation, it is possible to use, for example, the number of times of execution of the discharge toner band forming operation per unit image-formed sheet number, the number of times of continuous execution of the discharge toner band forming operations, and the like. Further, with an increasing execution frequency, the above-described ratio D1/D2 can be made large.

Thus, in this embodiment, the predetermined toner image (discharge toner band) is prepared by repetitively forming the minimum unit pattern in the above-described first direction (feeding direction) and the above-described second direction (longitudinal direction) within at least the predetermined range of the leading end portion thereof in the first direction. On the basis of the information on the execution history of the predetermined operation (discharge toner band forming operation), the controller 200 is capable of changing at least one of the dot number of the print portion in the second discharge and the dot number of the non-print portion adjacent to the print portion in the second discharge, in the above-described minimum unit pattern. In this embodiment, the controller 200 is capable of changing at least one of the above-described dot number of the print portion and the above-described dot number of the non-print portion so that the ratio D1/D2 of the dot number of the print portion to the dot number of the non-print portion in the case where the number of times of the execution of the above-described predetermined operations per unit image-formed sheet number indicated by the above-described information on the execution history is a first number of times is a first value and so that the above-described ratio D1/D2 in the case where the number of times of the above-described execution is a second number of times larger than the first number of times is a second value higher than the first value.

As described above, according to this embodiment, not only the improper cleaning of the discharge toner band is suppressed, but also it is possible to further suppress the lowering in productivity by minimizing the time required to perform the discharge toner band forming operation.

OTHER EMBODIMENTS

As described above, the present invention was described in accordance with the specific embodiments, but the present invention is not limited to the above-described embodiments.

In the above-described embodiments, the image forming apparatus was the full-color image forming apparatus of the tandem type, but the present invention is not limited thereto. The image forming apparatus is not limited to the image forming apparatus of the tandem type, but may also be, for example, an image forming apparatus of another type such as a type including a constitution in which toner images of a plurality of colors are successively formed on a single photosensitive member and are primary-transferred superposedly onto an intermediary transfer member, and then are secondary-transferred collectively onto a recording material. Further, the image forming apparatus is not limited to the full-color image forming apparatus, but may also be a monochromatic image forming apparatus capable of forming a black or monochromatic image. Further, the image forming apparatus may also be carried out for various uses, such as printers, various printing machines, copying machines, facsimile apparatuses, and multi-function machines.

Further, in this embodiment, the pattern such that the non-print portion and the print portion were alternately repeated in the longitudinal direction of the cleaning blade was described, but is not limited thereto. For example, the pattern may also be a pattern such that a high-density print portion close to a solid density print portion and a low-density print portion which is a low-density half-tone print portion are alternately repeated. In this case, it may only be required that a relationship in dot number between the high-density print portion and the low-density print portion is similar to the above-described relationship between the dot number of the print portion and the dot number of the non-print portion. That is, in at least a predetermined range of the leading end portion in the first direction (feeding direction), when the discharge toner band is viewed per unit area of 1 mm in each of the first direction (feeding direction) and the second direction (longitudinal direction), the discharge toner band is formed at a higher density than an average density in the above-described unit area, and may be prepared by repetitively forming the high-density print portion extending along the first direction (feeding direction) and the low-density print portion which is lower in density than the average density in the above-described unit area, which is adjacent to the high-density print portion, and which extends along the first direction (feeding direction). Further, in at least a predetermined range of the leading end portion in the first direction (feeding direction), when the lubricating toner band is viewed per unit area of 1 mm in each of the first direction (feeding direction) and the second direction (longitudinal direction), the discharge toner band is formed at a higher density than an average density in the above-described unit area, and may be prepared by repetitively forming the high-density print portion extending along the first direction (longitudinal direction) and the low-density print portion which is lower in density than the average density in the above-described unit area, which is adjacent to the high-density print portion, and which extends along the second direction (longitudinal direction).

Further, in this embodiment, the constitution in which the minimum unit pattern comprising the non-print portion and the print portion is repeated in the longitudinal direction of the cleaning blade was described, but is not limited thereto. When the non-print portion and the print portion are alternately repeated, the dot number of each of the print portion and the non-print portion may also be not constant.

According to the present invention, it is possible to suppress the improper cleaning of the discharge toner band while suppressing the lowering in productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-023876 filed on Feb. 17, 2023, which is hereby incorporated by reference herein in its entirety.

What is claimed is:

1. An image forming apparatus comprising:

a rotatable image bearing member configured to bear a toner image;

an image forming portion including a developing device for developing an electrostatic image with toner and configured to form the toner image on the image bearing member;

a transfer portion configured to transfer the toner image from the image bearing member onto a recording material;

a cleaning blade configured to remove the toner from the image bearing member; and a controller configured to carry out control so as to execute a predetermined operation in which a predetermined toner image which is not to be transferred onto the recording material is formed on the image bearing member and then is removed from the image bearing member by the cleaning blade, wherein at least in a predetermined range of a leading end portion of the predetermined toner image with respect to a first direction which is a surface movement direction of the image bearing member, when the predetermined toner image is viewed per unit area of 1 mm in each of the first direction and a second direction, which is a widthwise direction of the image bearing member perpendicular to the first direction, the predetermined toner image includes a plurality of print portions extending along a predetermined direction and formed at different positions with respect to the second direction, and the predetermined direction forms an angle of 30° or less between itself and the first direction, wherein the predetermined toner image is formed so that a minimum unit pattern is repeated in each of the first direction and the second direction at least in the predetermined range, and wherein on the basis of information on an execution history of the predetermined operation, the controller is capable of changing at least one of a number of dots of each print portion of the minimum unit pattern with respect to the second direction and a number of dots of each non print portion adjacent to the print portion of the minimum unit pattern with respect to the second direction.

2. An image forming apparatus according to claim 1, wherein at least in the predetermined range, the predetermined toner image includes a plurality of non-print portions provided adjacent to the print portions, respectively, in the second direction at different positions and extending along the predetermined direction, and with respect to the second direction, a width Wa of each of the print portions is narrower than a width Wb of each of the non-print portions.

3. An image forming apparatus according to claim 2, wherein with respect to the second direction, the width Wa and the width Wb satisfy the following relationship:

$$1/10 \leq W1/W2 < 3/5.$$

4. An image forming apparatus according to claim 2, wherein with respect to, the width Wa and the width Wb satisfy the following relationship:

$$1/5 \leq W1/W2 < 2/5.$$

5. An image forming apparatus according to claim 1, wherein at least in the predetermined range, each print portion is a line-shaped toner band formed substantially continuously over a substantially whole region with respect to the first direction.

6. An image forming apparatus according to claim 1, wherein with respect to the second direction, a number of continuous dots of each print portion is four dots or less.

7. An image forming apparatus according to claim 1, wherein with respect to the second direction, a number of continuous dots of each print portion is three dots or less.

8. An image forming apparatus according to claim 1, wherein with respect to the second direction, a number of continuous dots of each print portion is two.

9. An image forming apparatus according to claim 1, wherein the controller executes the predetermined operation on the basis of an index value correlating with a print ratio of the toner image formed on the image bearing member.

10. An image forming apparatus according to claim 1, wherein the predetermined direction and the first direction form an angle of 10° or less.

11. An image forming apparatus according to claim 1, wherein the predetermined direction is parallel to the first direction.

12. An image forming apparatus according to claim 1, wherein the predetermined toner image is formed so as to include a first region in the predetermined range and a second region on a trailing end side thereof than the predetermined range with respect to the first direction, and a toner amount per the unit area of the second region is larger than a toner amount per the unit area of the first region.

13. An image forming apparatus according to claim 12, wherein the second region is formed of a solid image.

14. An image forming apparatus according to claim 1, wherein the predetermined range is a range from a leading end of the predetermined toner image with respect to the first direction to a position of 2 mm from the leading end toward a trailing end side of the predetermined toner image with respect to the first direction.

15. An image forming apparatus according to claim 1, wherein the controller is capable of changing at least one of the number of dots of each print portion and the number of dots of each non-print portion so that a ratio of a number D1 of dots of each print portion to a number D2 of dots of each non-print portion (D1/D2) in a case that a number of execution times of the predetermined operation per unit image-formed sheet number indicated by the information on the execution history is a first number of times is a first value and so that a ratio D1/D2 in a case that the number of the execution times is a second number of times larger than the first number of times is a second value higher than the first value.

16. An image forming apparatus according to claim 1, wherein the predetermined toner image is formed over a substantially whole region of an image forming region with respect to the second direction.

17. An image forming apparatus comprising:

a rotatable image bearing member configured to bear a toner image;

an image forming portion including a developing device for developing an electrostatic image with toner and configured to form the toner image on the image bearing member;

a transfer portion configured to transfer the toner image from the image bearing member onto a recording material;

a cleaning blade configured to remove the toner from the image bearing member; and a controller configured to carry out control so as to execute a first operation in which a first toner image which is not to be transferred onto the recording material is formed on the image bearing member and then is removed from the image bearing member by the cleaning blade, and so as to execute a second operation in which a second toner image which is not to be transferred onto the recording material is formed on the image bearing member and then is removed from the image bearing member by the cleaning blade, wherein at least in a predetermined range of a leading end portion of the first toner image with respect to a first direction which is a surface movement direction of the image bearing member, when the first toner image is viewed per unit area of 1 mm in each of the first direction and a second direction which is a widthwise direction of the image bearing member perpendicular to the first direction, the first toner image includes a plurality of first print portions extending along a first predetermined direction and formed at different positions with respect to the second direction, and the first predetermined direction forms an angle of 30° or less between itself and the first direction, wherein when the second toner image is viewed per unit area of 1 mm in each of the first direction and the second direction, the second toner image includes a plurality of second print portions extending along a second predetermined direction and formed at different positions with respect to the first direction, and the second predetermined direction forms an angle of 30° or less between itself and the second direction, wherein the first toner image is formed so that a minimum unit pattern is repeated in each of the first direction and the second direction at least in the predetermined range, and wherein on the basis of information on an execution history of the first operation, the controller is capable of changing at least one of a number of dots of each print portion of the minimum unit pattern with respect to the second direction and a number of dots of each non print portion adjacent to the print portion of the minimum unit pattern with respect to the second direction.

18. An image forming apparatus according to claim 17, wherein the first toner image is a toner image formed for refreshing the toner in the developing device, and the second toner image is a toner image for being supplied to a contact portion of the cleaning blade.

19. An image forming apparatus according to claim 17, wherein the first operation is executed on the basis of a first index value correlating with a print ratio of the toner image formed on the image bearing member, and the second operation is executed on the basis of a second index value correlating with a number of image-formed sheets irrespective of the first index value.

20. An image forming apparatus according to claim 17, wherein at least in the predetermined range, the first toner image includes a plurality of first non-print portions provided adjacent to the first print portions, respectively, in the second direction at different positions and extending along the first predetermined direction, and with respect to the second direction, a width W11 of each of the first print portions is narrower than a width W12 of each of the first non-print portions.

21. An image forming apparatus according to claim 17, wherein the second toner image includes a plurality of second non-print portions provided adjacent to the second print portions, respectively, in the first direction at different positions and extending along the second predetermined direction, and with respect to the first direction, a width W21 of each of the second print portions is narrower than a width W22 of each of the second non-print portions.

* * * * *